United States Patent
Ito

(10) Patent No.: US 11,268,977 B2
(45) Date of Patent: Mar. 8, 2022

(54) INERTIAL SENSOR, ELECTRONIC APPARATUS, AND VEHICLE

(71) Applicant: Seiko Epson Corporation, Tokyo (JP)

(72) Inventor: Fumiya Ito, Chikuma (JP)

(73) Assignee: Seiko Epson Corporation

( * ) Notice: Subject to any disclaimer, the term of this patent is extended or adjusted under 35 U.S.C. 154(b) by 1 day.

(21) Appl. No.: 17/004,108

(22) Filed: Aug. 27, 2020

(65) Prior Publication Data

US 2021/0063433 A1     Mar. 4, 2021

(30) Foreign Application Priority Data

Aug. 28, 2019   (JP) .............................. JP2019-155528

(51) Int. Cl.
  *G01P 15/125*   (2006.01)
  *G01P 1/02*      (2006.01)
  *B60R 21/0132*  (2006.01)

(52) U.S. Cl.
  CPC ............ *G01P 15/125* (2013.01); *G01P 1/023* (2013.01); *B60R 21/0132* (2013.01)

(58) Field of Classification Search
  CPC ..................................................... G01P 15/125
  See application file for complete search history.

(56) References Cited

U.S. PATENT DOCUMENTS 8,923,004 B2 * 12/2014 Low ....................... H01L 25/03
                                                        361/760
2017/0199217 A1   7/2017 Naruse et al.
2019/0064204 A1   2/2019 Matsuzawa

FOREIGN PATENT DOCUMENTS

| JP | 2014-190838 A | 10/2014 |
| JP | 2017-126627 A | 7/2017 |
| JP | 2018-072170 A | 5/2018 |
| JP | 2019-039885 A | 3/2019 |

* cited by examiner

*Primary Examiner* — Walter L Lindsay, Jr.
*Assistant Examiner* — Andrew V Do
(74) *Attorney, Agent, or Firm* — Harness, Dickey & Pierce, P.L.C.

(57) ABSTRACT

An inertial sensor includes: a sensor unit; a base substrate having the sensor unit arranged at one surface thereof and having a first lateral surface and a second lateral surface; a package accommodating the sensor unit and the base substrate and having an inner bottom surface, a first inner wall surface, and a second inner wall surface; a first adhesive bonding together an other surface of the base substrate and an inner bottom surface of the package; a second adhesive bonding together the first inner wall surface of the package and the first lateral surface; and a third adhesive bonding together the second inner wall surface of the package and the second lateral surface.

15 Claims, 17 Drawing Sheets

|  | ADHESIVE A | ADHESIVE B | ADHESIVE C | ADHESIVE D | ADHESIVE E |
|---|---|---|---|---|---|
| MAIN MATERIAL | EPOXY | EPOXY | POLYIMIDE | SILICONE | POLYURETHANE |
| MODULUS OF ELASTICITY [Gpa] | 10~50 | 2~6 | 2~3 | 0.0005~0.005 | 0.07~0.7 |
| COEFFICIENT OF LINEAR EXPANSION [ppm/°C] | 5~20 | 30~60 | 50~70 | 250~500 | 100~200 |

FIG. 12

| STATE | NO BONDING | TWO-SIDE BONDING | FOUR-SIDE BONDING |
|---|---|---|---|
| AMOUNT OF WARP | 1.00 | 0.83 | 0.85 |
| PLAN VIEW | 10, 22 | 22c, 22d, 12c, 12d, 10, 38, 22, 39 | 22c, 12e, 38, 22e, 22d, 12c, 12d, 10, 38, 12f, 38, 22, 22f, 39 |
| CROSS-SECTIONAL VIEW | 11a, 22, 22a, 10, 18, 22b | 38, 22, 22a, 39, 10, 18, 22b | 38, 22, 22a, 39, 10, 38, 22b |

INERTIAL SENSOR, ELECTRONIC APPARATUS, AND VEHICLE

The present application is based on, and claims priority from JP Application Serial Number 2019-155528, filed Aug. 28, 2019, the disclosure of which is hereby incorporated by reference herein in its entirety.

BACKGROUND

1. Technical Field

The present disclosure relates to an inertial sensor, a method for manufacturing an inertial sensor, an electronic apparatus, and a vehicle.

2. Related Art

An inertial sensor manufactured using the silicon MEMS (micro-electromechanical systems) technology has been developed. For example, JP-A-2019-39885 discloses a physical quantity sensor in which a bottom surface of a sensor element is bonded to a package with a bonding agent. JP-A-2017-126627 discloses a physical quantity sensor in which a lateral surface of a sensor element is bonded to a lateral surface of a package with an adhesive.

In the inertial sensor of JP-A-2019-39885, the sensor element is bonded to the package only via the bottom surface of a base substrate forming the sensor element. Therefore, the base substrate warps due to at least one of expansion and contraction of the adhesive caused by a change in the ambient temperature. This warp causes a change in the detection signal outputted from the inertial sensor and therefore makes it difficult to accurately detect inertia such as angular velocity or acceleration.

In the inertial sensor of JP-A-2017-126627, the sensor element is bonded to the lateral surface of the package only via the lateral surface of a base substrate forming the sensor element. Therefore, the accuracy of the installation position of the sensor element to the package may drop.

SUMMARY

An inertial sensor includes: a sensor unit; a base substrate having the sensor unit arranged at one surface thereof and having a first lateral surface intersecting the one surface and a second lateral surface opposite to the first lateral surface; a package accommodating the sensor unit and the base substrate; a first adhesive bonding together an other surface of the base substrate and an inner bottom surface of the package; a second adhesive bonding together a first inner wall surface which intersects the inner bottom surface of the package and is opposite the first lateral surface, and the first lateral surface, the second adhesive being different from the first adhesive; and a third adhesive bonding together a second inner wall surface which intersects the inner bottom surface of the package and is opposite the second lateral surface, and the second lateral surface, the third adhesive being different from the first adhesive.

In the inertial sensor, the base substrate may be a rectangle having a first shorter side and a second shorter side opposite the first shorter side, as viewed in a plan view. The first lateral surface may correspond to the first shorter side. The second lateral surface may correspond to the second shorter side.

In the inertial sensor, the base substrate may have a third lateral surface intersecting the one surface and adjacent to the first lateral surface and the second lateral surface, and a fourth lateral surface intersecting the one surface and adjacent to the first lateral surface and the second lateral surface and opposite to the third lateral surface. The package may have a third inner wall surface intersecting the inner bottom surface and adjacent to the first inner wall surface and the second inner wall surface, and a fourth inner wall surface intersecting the inner bottom surface and adjacent to the first inner wall surface and the second inner wall surface and opposite to the third inner wall surface. The second adhesive may extend between the third lateral surface and the third inner wall surface and bond together the third lateral surface and the third inner wall surface. The second adhesive may extend between the fourth lateral surface and the fourth inner wall surface and bond together the fourth lateral surface and the fourth inner wall surface.

In the inertial sensor, the second adhesive and the third adhesive may have a lower coefficient of linear expansion than the first adhesive.

In the inertial sensor, the second adhesive and the third adhesive may have a higher coefficient of linear expansion than the base substrate.

In the inertial sensor, the second adhesive and the third adhesive may have a higher modulus of elasticity than the first adhesive.

In the inertial sensor, the first adhesive may be one of a silicone-based adhesive and a polyimide-based adhesive. The second adhesive and the third adhesive may be epoxy-based adhesives.

In the inertial sensor, the first adhesive, the second adhesive, and the third adhesive may be epoxy-based adhesives having different coefficients of linear expansion and different moduli of elasticity from each other.

In the inertial sensor, an unevenness may be formed at the first lateral surface and the second lateral surface.

A method for manufacturing an inertial sensor including a sensor unit, a base substrate having the sensor unit arranged at one surface thereof and having a first lateral surface intersecting the one surface and a second lateral surface opposite to the first lateral surface, a package accommodating the sensor unit and the base substrate, a first adhesive bonding together an other surface of the base substrate and an inner bottom surface of the package, a second adhesive bonding together a first inner wall surface which intersects the inner bottom surface of the package and is opposite the first lateral surface, and the first lateral surface, the second adhesive being different from the first adhesive, and a third adhesive bonding together a second inner wall surface which intersects the inner bottom surface of the package and is opposite the second lateral surface, and the second lateral surface, the third adhesive being different from the first adhesive. The method includes: a first bonding step of bonding together the other surface of the base substrate and the inner bottom surface of the package with the first adhesive; a second bonding step of bonding together the first lateral surface of the base substrate and the first inner wall surface of package with the second adhesive; and a third bonding step of bonding together the second lateral surface of the base substrate and the second inner wall surface of the package with the third adhesive.

An electronic apparatus includes: the inertial sensor according to any of the above descriptions; and a control circuit performing control based on a detection signal outputted from the inertial sensor.

A vehicle includes: the inertial sensor according to any of the above descriptions; and a control circuit performing control based on a detection signal outputted from the inertial sensor.

BRIEF DESCRIPTION OF THE DRAWINGS

FIG. 12 is a table showing the bonding positions with a second adhesive and a third adhesive and the amounts of warp of a base substrate.

DESCRIPTION OF EXEMPLARY EMBODIMENTS

1. Embodiment 1

Figure 1:
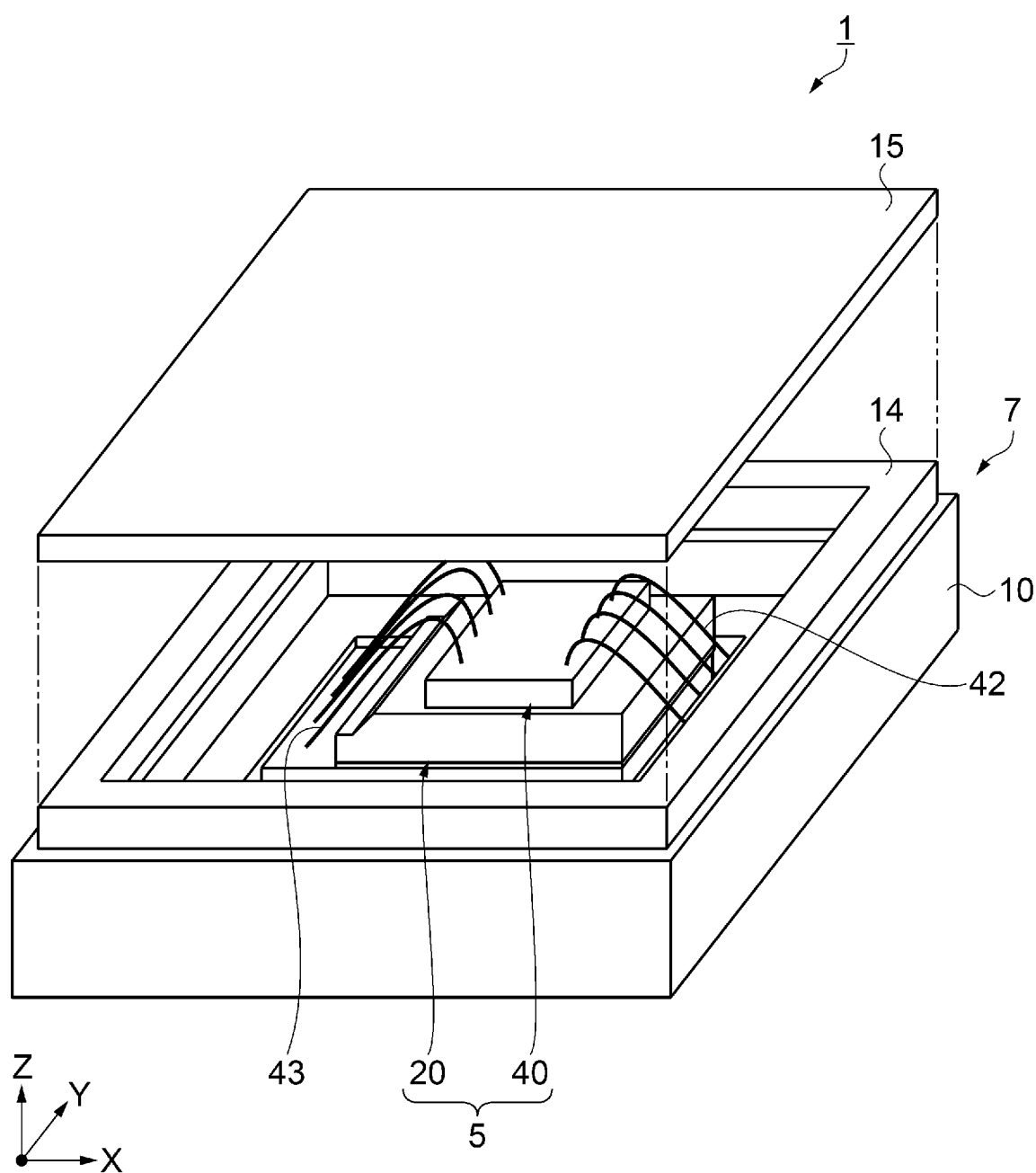
FIG. 1 is a perspective view showing a schematic configuration of an inertial sensor according to Embodiment 1.
Figure 2A:
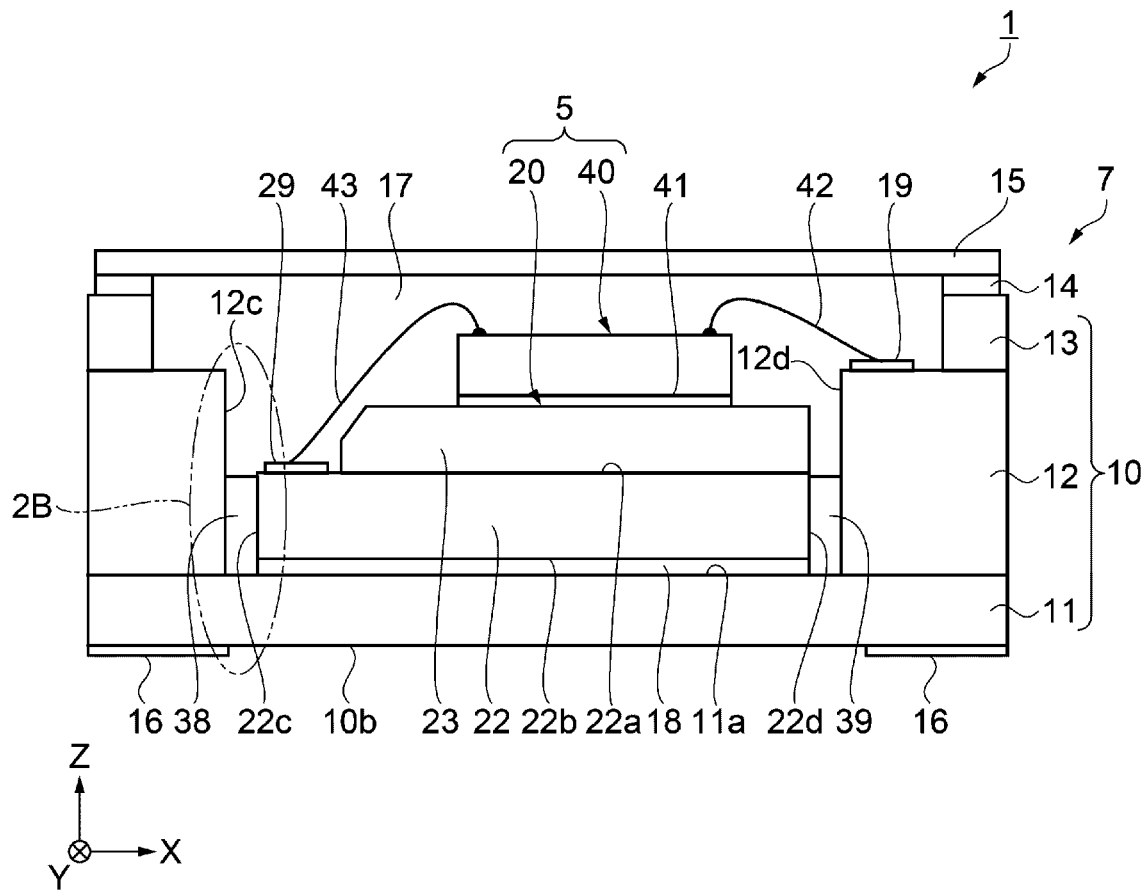
FIG. 2A is a cross-sectional view showing a schematic configuration of the inertial sensor.
Figure 2B:
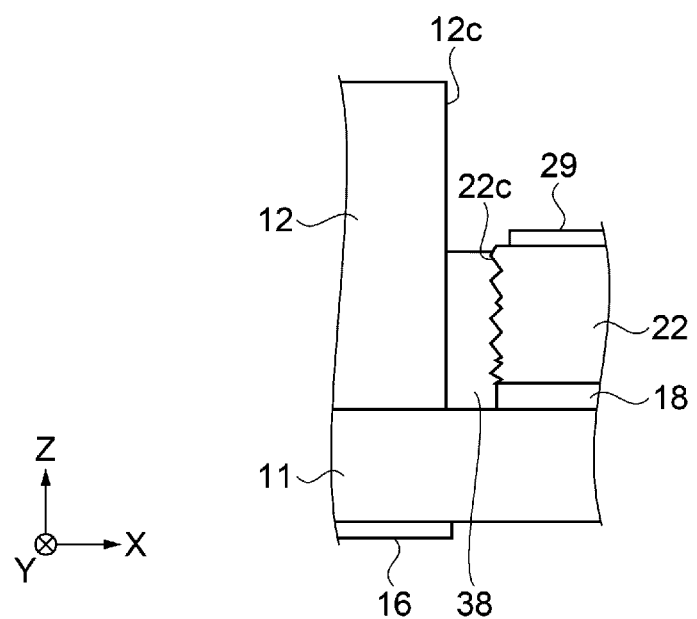
FIG. 2B is an enlarged view of a 2B part in FIG. 2A.
Figure 3:
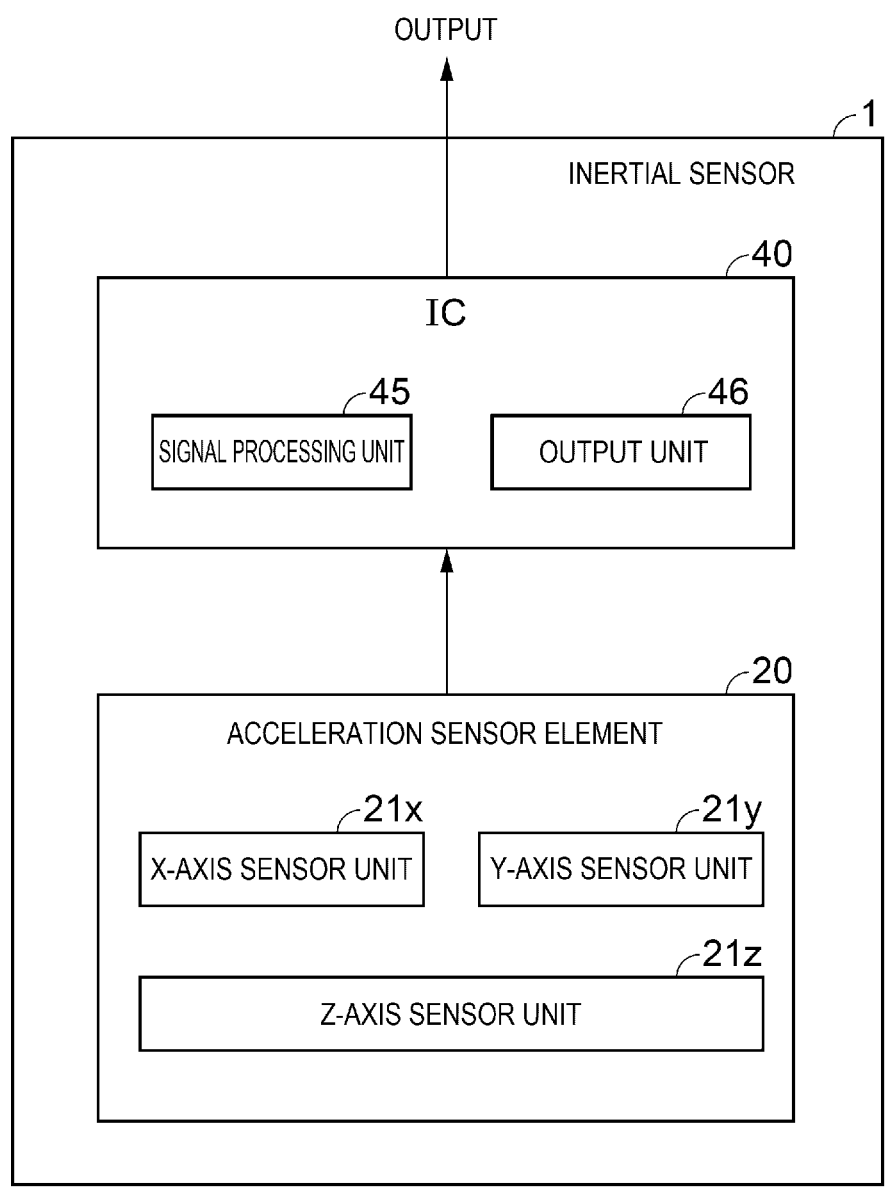
FIG. 3 is a functional block diagram of the inertial sensor.
Figure 4:
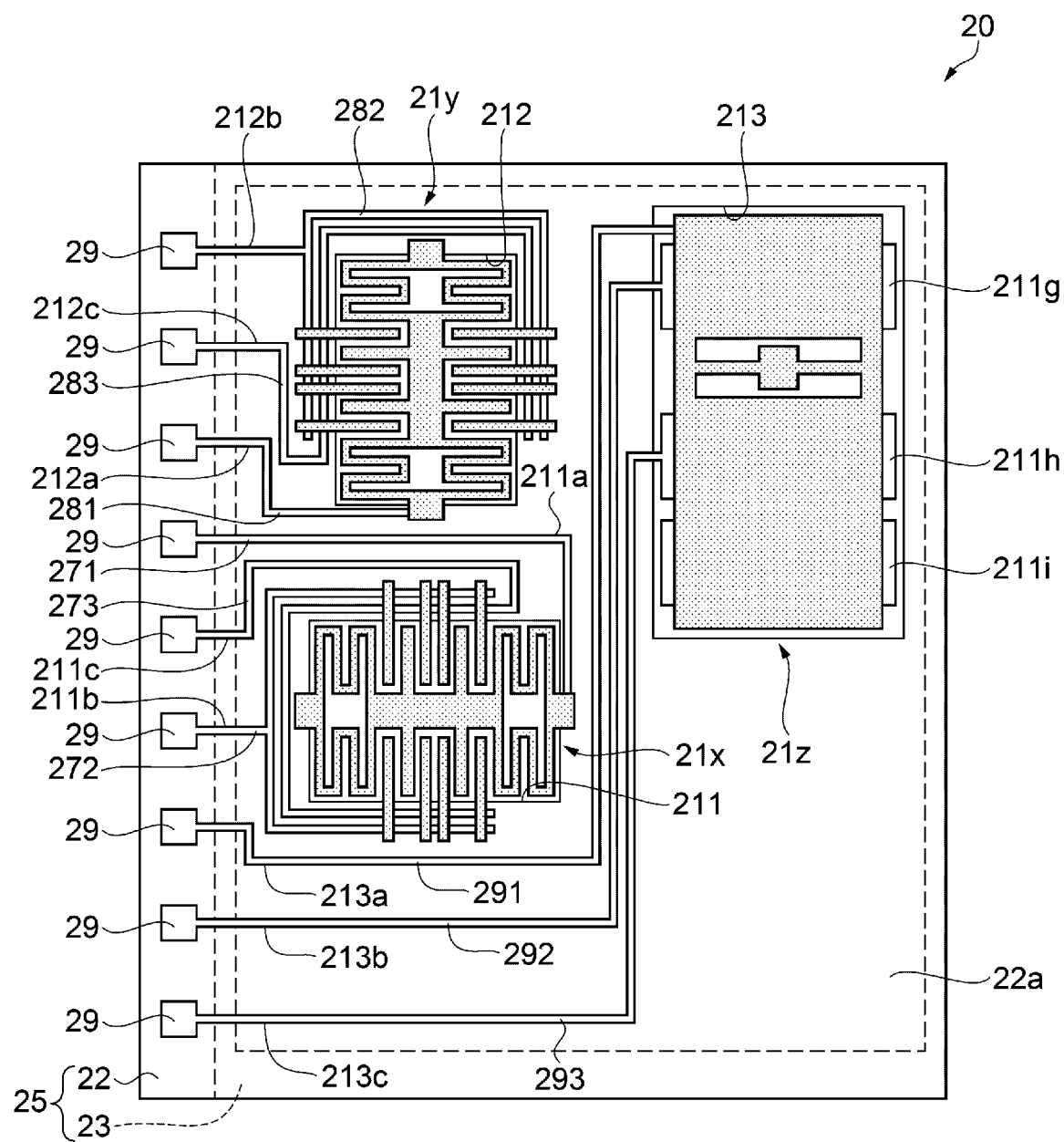
FIG. 4 is a plan view showing an example of arrangement of a sensor element used in the inertial sensor.
Figure 5:
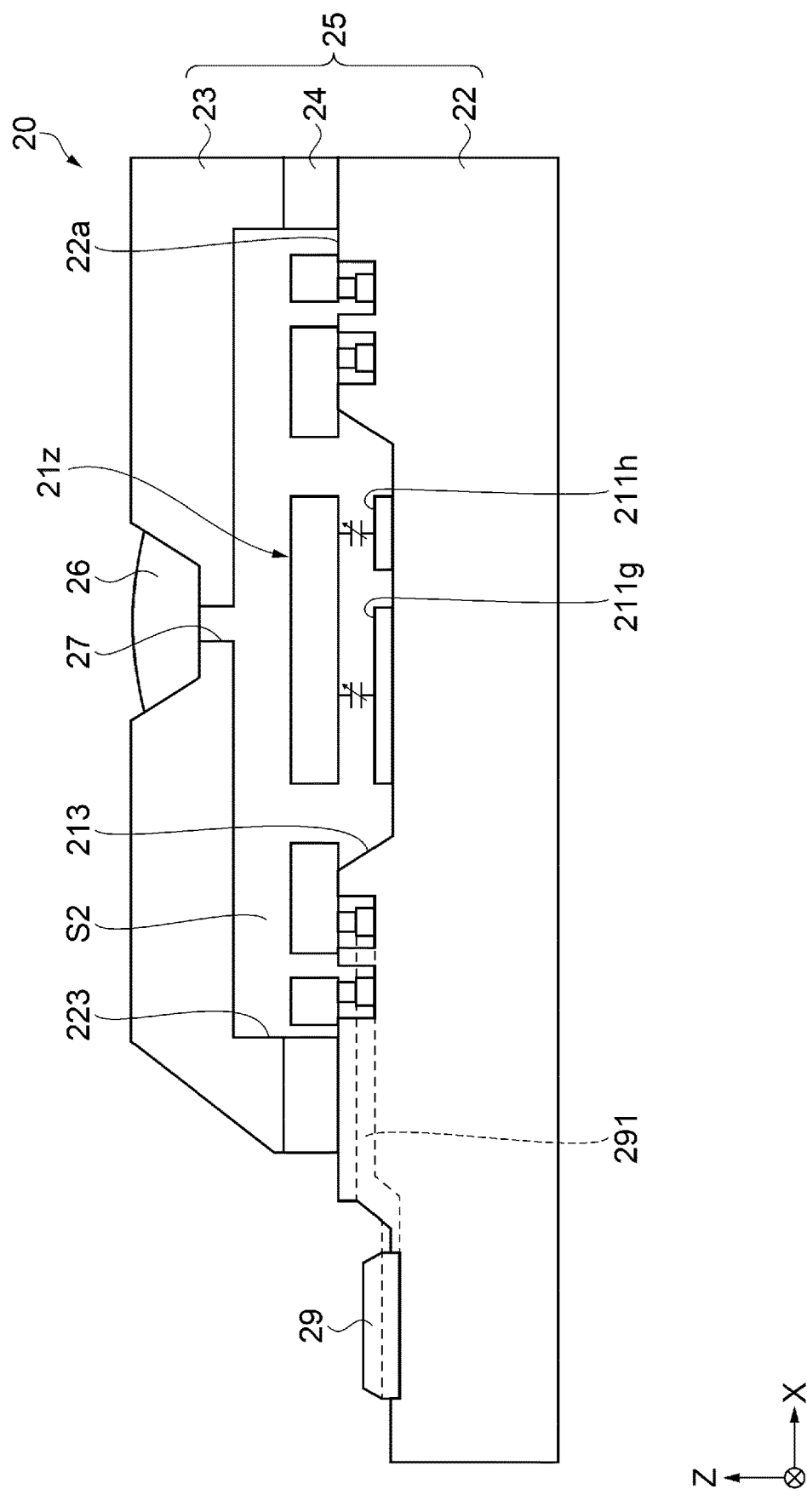
FIG. 5 is a cross-sectional view showing a schematic configuration of the sensor element.
Figure 6:
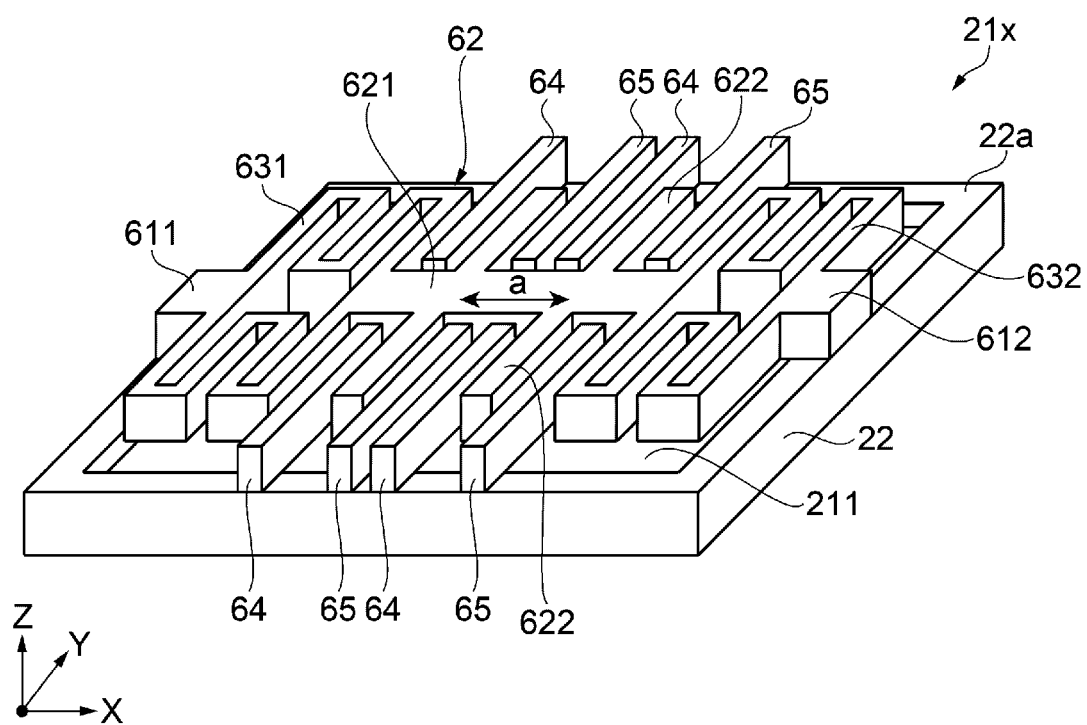
FIG. 6 is a perspective view showing a schematic configuration of an X-axis sensor unit of the sensor element.
Figure 7:
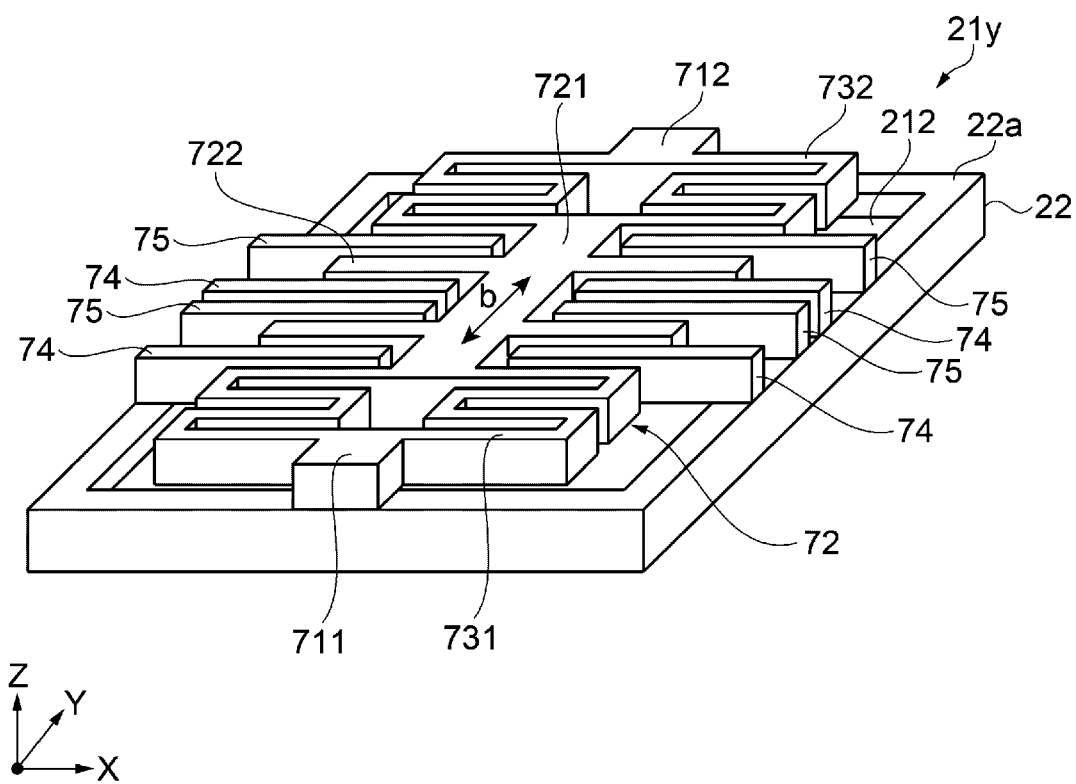
FIG. 7 is a perspective view showing a schematic configuration of a Y-axis sensor unit.
Figure 8:
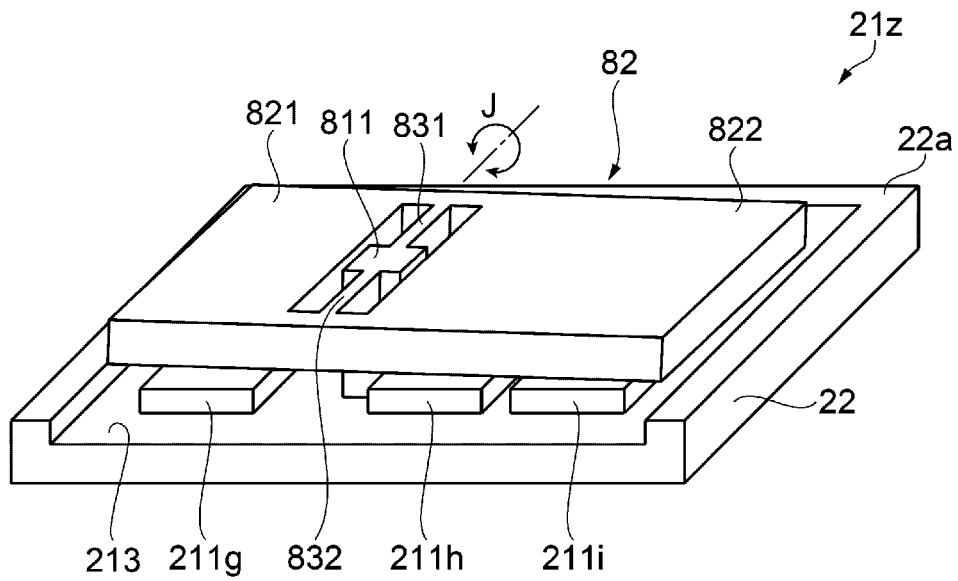
FIG. 8 is a perspective view showing a schematic configuration of a Z-axis sensor unit.

FIG. 1 is a perspective view showing a schematic configuration of an inertial sensor according to Embodiment 1. FIG. 2A is a cross-sectional view showing a schematic configuration of the inertial sensor. FIG. 2B is an enlarged view of a 2B part in FIG. 2A. FIG. 3 is a functional block diagram of the inertial sensor. FIG. 4 is a plan view showing an example of arrangement of a sensor element used in the inertial sensor. For the sake of convenience of the description, FIG. 4 shows the state where a lid is omitted. FIG. 5 is a cross-sectional view showing a schematic configuration of the sensor element. FIG. 6 is a perspective view showing a schematic configuration of an X-axis sensor unit of the sensor element. FIG. 7 is a perspective view showing a schematic configuration of a Y-axis sensor unit. FIG. 8 is a perspective view showing a schematic configuration of a Z-axis sensor unit.

The coordinate system shown in the drawings employs an X-axis, a Y-axis, and a Z-axis as three axes orthogonal to each other. The tip side of the arrow on the X-axis, the Y-axis, and the Z-axis is referred to as a "positive side". The two directions along the Z-axis are up and down directions. The tip side of the arrow on the Z-axis is defined as "up". The up and down directions correspond to the direction in which respective parts of the inertial sensor are stacked.

An inertial sensor 1 shown in FIGS. 1 to 3 can be used as a three-axis acceleration sensor which separately detects accelerations along the X-axis, the Y-axis, and the Z-axis. The inertial sensor 1 has a structure 5 and a package 7 accommodating the structure 5. The structure 5 has an acceleration sensor element 20 as a sensor element, and an IC (integrated circuit) 40 arranged at the top of the acceleration sensor element 20. The acceleration sensor element 20 has a base substrate 22 and a cap part 23 covering a sensor unit, described later. That is, the package 7 accommodates the sensor unit and the base substrate 22.

The base substrate 22 has a top surface 22a as one surface, a back surface 22b as an other surface, a first lateral surface 22c intersecting the top surface 22a, and a second lateral surface 22d opposite to the first lateral surface 22c. The term "intersecting" means that an XY plane including the top surface 22a and a YZ plane including the first lateral surface 22c intersect each other.

The package 7 has a first inner wall surface 12c intersecting an inner bottom surface 11a and opposite the first lateral surface 22c of the base substrate 22, and a second inner wall surface 12d intersecting the inner bottom surface 11a and opposite the second lateral surface 22d of the base substrate 22.

The back surface 22b of the base substrate 22 and the inner bottom surface 11a of the package 7 are bonded together via a first adhesive 18. The first lateral surface 22c of the base substrate 22 and the first inner wall surface 12c of the package 7 are bonded together via a second adhesive 38. The second lateral surface 22d of the base substrate 22 and the second inner wall surface 12d of the package 7 are bonded together via a third adhesive 39.

The package 7 includes a base unit 10 formed of a first base member 11, a second base member 12, and a third base member 13, and a lid 15 coupled to the third base member 13 via a sealing member 14. The first base member 11 is in the shape of a flat plate. The second base member 12 and the third base member 13 are ring-shaped with a center part removed. The sealing member 14 such as a seal ring or low-melting-point glass is formed at a circumferential edge of the upper surface of the third base member 13. The inner bottom surface 11a corresponds to the upper surface of the first base member 11. The first inner wall surface 12c and the second inner wall surface 12d correspond to the inner wall of the second base member 12.

In the package 7, the second base member 12 and the third base member 13 form a recess accommodating the structure 5. In the package 7, the lid 15 closes the opening of the recess and thus provides an accommodation space 17 which is an airtight space. The accommodation space 17 can accommodate the structure 5. The accommodation space 17 is airtightly sealed, having an atmosphere with a lower pressure than barometric pressure, or an inert gas atmosphere of nitrogen, argon, helium or the like. A part of wiring patterns and electrode pads formed in the base unit 10 including the first base member 11 and the second base member 12 is omitted from the illustration.

A ceramic or the like can be used as a preferable material forming the first base member 11, the second base member 12, and the third base member 13. However, a glass, resin, metal or the like, other than the ceramic, may be used as a material forming the first base member 11, the second base member 12, and the third base member 13. As a material forming the lid 15, for example, a metal material such as Kovar, glass material, silicon material, ceramic material, resin material or the like can be used.

A plurality of internal terminals 19 are arranged at the upper surface of the second base member 12. A plurality of external terminals 16 are arranged at an outer bottom surface 10b of the package 7, which is the lower surface of the first base member 11. The internal terminals 19 are electrically coupled to the corresponding external terminals 16 via an internal wiring or the like formed in the base unit 10.

The structure 5 includes the acceleration sensor element 20 and the IC 40 coupled to the top of the acceleration sensor element 20 via an adhesive layer 41. The structure 5 is bonded to the inner bottom surface 11a of the package 7. Stacking the acceleration sensor element 20 and the IC 40 at the inner bottom surface 11a of the package 7 in this way can increase layout efficiency in the planar direction and can reduce the area of the inertial sensor 1 as viewed in a plan view.

As shown in FIGS. 4 and 5, the acceleration sensor element 20 has a container 25 having the base substrate 22 and the cap part 23, and a sensor unit arranged at the top surface 22a of the base substrate 22. In this embodiment, as the sensor unit, an X-axis sensor unit 21x detecting an acceleration in a direction along the X-axis, a Y-axis sensor unit 21y detecting an acceleration in a direction along the Y-axis, and a Z-axis sensor unit 21z detecting an acceleration in a direction along the Z-axis are provided. These sensor units are accommodated in the container 25. In FIG. 5, for the sake of convenience of the description, only the Z-axis sensor unit 21z is conceptually illustrated as a sensor unit.

At the base substrate 22, recesses 211, 212, 213 opening to the top surface 22a are formed. The recess 211 functions as a clearance to prevent contact between the X-axis sensor unit 21x arranged above the recess 211 and the base substrate 22. The recess 212 functions as a clearance to prevent contact between the Y-axis sensor unit 21y arranged above the recess 212 and the base substrate 22. The recess 213 functions as a clearance to prevent contact between the Z-axis sensor unit 21z arranged above the recess 213 and the base substrate 22.

At the base substrate 22, recesses 211a, 211b, 211c, recesses 212a, 212b, 212c, and recesses 213a, 213b, 213c opening to the top surface 22a are formed. The recesses 211a, 211b, 211c are arranged around the recess 211. Wirings 271, 272, 273 for the X-axis sensor unit 21x are arranged in the recesses 211a, 211b, 211c. The recesses 212a, 212b, 212c are arranged around the recess 212. Wirings 281, 282, 283 for the Y-axis sensor unit 21y are arranged in the recesses 212a, 212b, 212c. The recesses 213a, 213b, 213c are arranged around the recess 213. Wirings 291, 292, 293 for the Z-axis sensor unit 21z are arranged in the recesses 213a, 213b, 213c. An end of each of the wirings 271, 272, 273, 281, 282, 283, 291, 292, 293 is exposed to the outside of the container 25. The exposed part is a coupling terminal 29. Each coupling terminal 29 is electrically coupled to an electrode pad of the IC 40 via a bonding wire 43.

The base substrate 22 is formed of, for example, a glass material containing alkali metal ions. As an example of such a glass material, a borosilicate glass such as Pyrex (trademark registered) glass can be used. Thus, the X-axis sensor unit 21x, the Y-axis sensor unit 21y, and the Z-axis sensor unit 21z, which are formed of a silicon substrate, can be firmly bonded to the base substrate 22 by anodic bonding. Since such a glass material can make the base substrate 22 light-transmissive, the inside of the container 25 can be observed via the base substrate 22. However, the material forming the base substrate 22 is not limited to a glass material. For example, a high-resistivity silicon material can be used. In this case, the X-axis sensor unit 21x, the Y-axis sensor unit 21y, and the Z-axis sensor unit 21z can be bonded to the base substrate 22, for example, by direct bonding or siloxane bonding, or via a resin-based adhesive, glass paste, metal layer or the like.

As shown in FIG. 6, the X-axis sensor unit 21x has support parts 611, 612, a moving part 62, coupling parts 631, 632, a plurality of first fixed electrode fingers 64, and a plurality of second fixed electrode fingers 65. The moving part 62 has a base part 621 and a plurality of moving electrode fingers 622 protruding to both sides along the Y-axis from the base part 621. The X-axis sensor unit 21x is formed of, for example, a silicon substrate doped with an impurity such as phosphorus or boron, and is electrically conductive.

The support parts 611, 612 are anodically bonded to the top surface 22a of the base substrate 22. The support part 612 is electrically coupled to the wiring 271 via a conductive bump. The moving part 62 is provided between these support parts 611, 612. The moving part 62 is coupled to the support parts 611, 612 via the coupling parts 631, 632. The coupling parts 631, 632 are elastically deformable along the X-axis, like a spring. Therefore, the moving part 62 is displaceable along the X-axis in relation to the support parts 611, 612, as indicated by an arrow a.

The plurality of first fixed electrode fingers 64 are arranged on one side of the two sides along the X-axis of the moving electrode fingers 622 and arrayed in an interdigital form, that is, meshing with the corresponding moving electrode fingers 622 via a space. Such a plurality of first fixed electrode fingers 64 are anodically bonded at one end thereof to the top surface 22a of the base substrate 22 and electrically coupled to the wiring 272 shown in FIG. 4 via a conductive bump.

The plurality of second fixed electrode fingers 65 are arranged on the other side of the two sides along the X-axis of the moving electrode fingers 622 and arrayed in an interdigital form, that is, meshing with the corresponding moving electrode fingers 622 via a space. Such a plurality of second fixed electrode fingers 65 are anodically bonded at one end thereof to the top surface 22a of the base substrate 22 and electrically coupled to the wiring 273 shown in FIG. 4 via a conductive bump.

Such an X-axis sensor unit 21x detects an acceleration along the X-axis in the following manner. That is, when an acceleration along the X-axis is applied, the moving part 62 is displaced along the X-axis while elastically deforming the coupling parts 631, 632, based on the magnitude of the acceleration. With this displacement, the electrostatic capacitance between the moving electrode fingers 622 and the first fixed electrode fingers 64 and the electrostatic capacitance between the moving electrode fingers 622 and the second fixed electrode fingers 65 change respectively in magnitude. Based on the change in the electrostatic capacitance, the IC 40 finds the acceleration.

The Y-axis sensor unit 21y has a configuration similar to that of the X-axis sensor unit 21x, except for being arranged in a state rotated 90 degrees, as viewed in a plan view.

As shown in FIG. 7, the Y-axis sensor unit 21y has support parts 711, 712, a moving part 72, coupling parts 731, 732, a plurality of first fixed electrode fingers 74, and a plurality of second fixed electrode fingers 75. The moving part 72 has a base part 721 and a plurality of moving electrode fingers 722 protruding to both sides along the X-axis from the base part 721.

The support parts 711, 712 are anodically bonded to the top surface 22a of the base substrate 22. The support part 711 is electrically coupled to the wiring 281 via a conductive bump. The moving part 72 is provided between these support parts 711, 712. The moving part 72 is coupled to the support parts 711, 712 via the coupling parts 731, 732. The coupling parts 731, 732 are elastically deformable along the Y-axis, like a spring. Therefore, the moving part 72 is displaceable along the Y-axis in relation to the support parts 711, 712, as indicated by an arrow b.

The plurality of first fixed electrode fingers 74 are arranged on one side of the two sides along the Y-axis of the moving electrode fingers 722 and arrayed in an interdigital form, that is, meshing with the corresponding moving electrode fingers 722 via a space. Such a plurality of first fixed electrode fingers 74 are anodically bonded at one end thereof to the top surface 22a of the base substrate 22 and electrically coupled to the wiring 282 shown in FIG. 4 via a conductive bump.

The plurality of second fixed electrode fingers 75 are arranged on the other side of the two sides along the Y-axis of the moving electrode fingers 722 and arrayed in an interdigital form, that is, meshing with the corresponding moving electrode fingers 722 via a space. Such a plurality of second fixed electrode fingers 75 are anodically bonded at one end thereof to the top surface 22a of the base substrate 22 and electrically coupled to the wiring 283 shown in FIG. 4 via a conductive bump.

Such a Y-axis sensor unit 21y detects an acceleration along the Y-axis in the following manner. That is, when an acceleration along the Y-axis is applied, the moving part 72 is displaced along the Y-axis while elastically deforming the coupling parts 731, 732, based on the magnitude of the acceleration. With this displacement, the electrostatic capacitance between the moving electrode fingers 722 and the first fixed electrode fingers 74 and the electrostatic capacitance between the moving electrode fingers 722 and the second fixed electrode fingers 75 change respectively in magnitude. Based on the change in the electrostatic capacitance, the IC 40 finds the acceleration.

As shown in FIG. 8, the Z-axis sensor unit 21z has a support part 811, a moving part 82, and a pair of coupling parts 831, 832 coupling the moving part 82 in such a way that the moving part 82 can swing in relation to the support part 811. The moving part 82 seesaws about the coupling parts 831, 832 serving as an axis J and in relation to the support part 811. Such a Z-axis sensor unit 21z is formed of, for example, a silicon substrate doped with an impurity such as phosphorus or boron.

The support part 811 is anodically bonded to the top surface 22a of the base substrate 22. The support part 811 is electrically coupled to the wiring 291 shown in FIG. 4 via a conductive bump. The moving part 82 is provided on both sides along the Y-axis of the support part 811. The moving part 82 has a first moving part 821 located more to the positive side along the Y-axis than the axis J, and a second moving part 822 located more to the negative side along the Y-axis than the axis J and larger than the first moving part 821. The first moving part 821 and the second moving part 822 have different moments of rotation from each other when an acceleration along the Z-axis is applied. The first moving part 821 and the second moving part 822 are designed in such a way that a predetermined tilt occurs in the moving part 82 according to the acceleration. Thus, when an acceleration along the Z-axis is applied, the moving part 82 seesaws about the axis J as the axis of rotation.

At a position opposite the first moving part 821 on the bottom surface of the recess 213, a first detection electrode 211g electrically coupled to the wiring 292 shown in FIG. 4 is arranged. At a position opposite the second moving part 822, a second detection electrode 211h electrically coupled to the wiring 293 shown in FIG. 4 is arranged. Therefore, an electrostatic capacitance is formed between the first moving part 821 and the first detection electrode 211g, and an electrostatic capacitance is formed between the second moving part 822 and the second detection electrode 211h. At a position opposite the second moving part 822 and more to the negative side along the Y-axis than the second detection electrode 211h, a counter electrode 211i can be provided. Preferably, the first detection electrode 211g, the second detection electrode 211h, and the counter electrode 211i are formed of, for example, a transparent conductive material such as ITO. The counter electrode 211i can be a dummy electrode.

Such a Z-axis sensor unit 21z detects an acceleration along the Z-axis in the following manner. That is, when an acceleration along the Z-axis is applied, the moving part 82 seesaws about the axis J as the axis of rotation. As the moving part 82 seesaws in this way, the distance between the first moving part 821 and the first detection electrode 211g and the distance between the second moving part 822 and the second detection electrode 211h change and the electrostatic capacitance between these components changes accordingly. Based on the change in the electrostatic capacitance, the IC 40 finds the acceleration.

As shown in FIG. 5, the cap part 23 has a recess 223 opening to the lower surface and is bonded to the base substrate 22 in such a way that the recess 223 and the recesses 211, 212, 213 together form an interface space S2. In this embodiment, such a cap part 23 is formed of a silicon substrate. The cap part 23 and the base substrate 22 are airtightly bonded together, using a glass frit 24, which is a low-melting-point glass adhesive. In the state where the cap part 23 is bonded to the base substrate 22, communication between inside and outside of the interface space S2 is generated via the recesses 211a to 211c, 212a to 212c, 213a to 213c formed in the base substrate 22. Therefore, for example, an $SiO_2$ film formed by a CVD method using tetraethoxysilane (TEOS) fills the recesses 211a to 211c, 212a to 212c, 213a to 213c. The cap part 23 is also provided with a stepped sealing hole 27 penetrating the cap part 23 from the recess 223 to the outside. The sealing hole 27 is sealed with a molten metal 26, for example, a molten gold-germanium alloy (AuGe), in the state where the interface space S2 has a nitrogen (N$_2$) atmosphere.

As shown in FIG. 2A, the IC 40 is arranged at the top of the cap part 23 of the acceleration sensor element 20 via the adhesive layer 41. The adhesive layer 41 is not particularly limited, provided that the adhesive layer 41 can fix the IC 40 at the top of the acceleration sensor element 20. For example, a solder, silver paste, resin-based adhesive or the like can be used.

The IC 40 includes, for example, a drive circuit driving the acceleration sensor element 20, a signal processing unit 45 detecting an acceleration along each of the X-axis, the Y-axis, and the Z-axis, based on a signal from the acceleration sensor element 20, and an output unit 46 converting a signal from a detection circuit into a predetermined signal and outputting the predetermined signal, or the like. The IC 40 has a plurality of electrode pads at a top surface thereof. Each electrode pad is electrically coupled to the internal terminal 19 of the second base member 12 via a bonding wire 42. Each electrode pad is electrically coupled to the coupling terminal 29 of the acceleration sensor element 20 via the bonding wire 43. Thus, the acceleration sensor element 20 can be controlled.

In the above Embodiment 1, a configuration in which the X-axis sensor unit 21x, the Y-axis sensor unit 21y, and the Z-axis sensor unit 21z, as three sensor units, are accommodated in the container 25 in the acceleration sensor element 20 as a sensor element, is described as an example. However, the acceleration sensor element may be an acceleration sensor element that can detect an acceleration along one axis or two axes.

In such an inertial sensor 1, the base substrate 22 forming the sensor unit warps slightly, due to a change in the ambient temperature in the environment where the inertial sensor 1 is used. For example, when the base substrate 22 warps convexly, the spacing between the fixed electrode finger and the moving electrode finger in the X-axis sensor unit 21x and the Y-axis sensor unit 21y broadens and the electrostatic capacitance generated between these electrodes changes. In the Z-axis sensor unit 21z, the distance between the moving electrode part and the detection electrode increases and the electrostatic capacitance generated between these electrodes changes. This may reduce the accuracy of detection of acceleration.

Thus, in the inertial sensor 1 according to this embodiment, the first lateral surface 22c of the base substrate 22 and the first inner wall surface 12c of the package 7 are bonded together with the second adhesive 38, and the second lateral surface 22d of the base substrate 22 and the second inner wall surface 12d of the package 7 are bonded together with the third adhesive 39, unlike in the inertial sensor having the related-art configuration, in which the acceleration sensor element 20 is bonded to the package 7 only via the back surface 22b of the base substrate 22 forming the acceleration sensor element 20. The second adhesive 38 and the third adhesive 39 contract in volume due to hardening after being applied. Therefore, a tensile stress acts in a horizontal direction along the top surface 22a of the base substrate 22. This tensile stress can restrain the base substrate 22 from warping due to the expansion and contraction of the first adhesive 18 when a temperature change is applied to the inertial sensor 1.

As shown in FIG. 2B, an unevenness is formed at the first lateral surface 22c and the second lateral surface 22d of the base substrate 22. To acquire the acceleration sensor element 20 shown in FIG. 5, the base substrate 22 where a plurality of acceleration sensor elements 20 are formed is divided into the individual acceleration sensor elements 20 by a dicing blade rotating at a high speed. The dicing blade may be a resin-bond blade formed of diamond abrasive grains bound together by a resin binder, an electroplated blade formed of diamond abrasive grains fixed to an end surface of an electric metal base material by a binder made of an alloy of a soft metal such as nickel or copper, or the like. Increasing the grain size of the diamond abrasive grains contained in the dicing blade or increasing the speed of relative movement between the dicing blade and the base substrate 22 can form a relatively large unevenness at the first lateral surface 22c and the second lateral surface 22d of the base substrate 22. This increases the contact area between the second adhesive 38 and the first lateral surface 22c of the base substrate 22 and the contact area between the third adhesive 39 and the second lateral surface 22d of the base substrate 22 and therefore can suitably restrain the base substrate 22 from warping.

Figure 9:
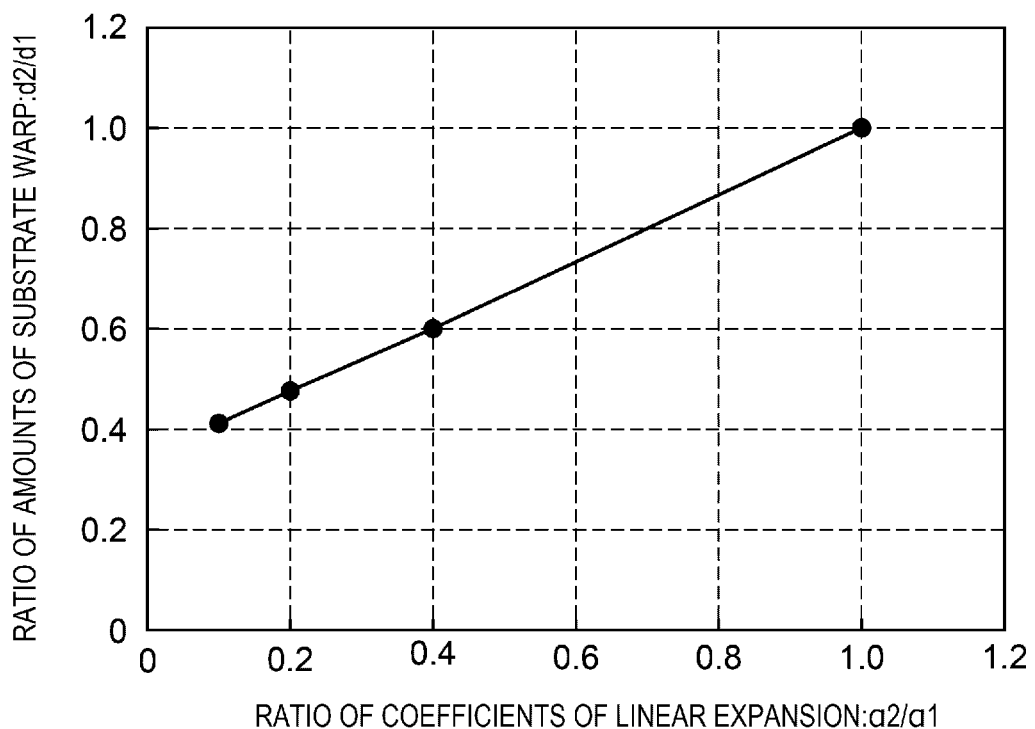
FIG. 9 is a graph showing the relationship between the ratio of coefficients of linear expansion and the ratio of amounts of substrate warp.

FIG. 9 is a graph showing the relationship between the ratio of coefficients of linear expansion and the ratio of amounts of substrate warp. The horizontal axis in FIG. 9 represents the ratio of coefficients of linear expansion $\alpha 2/\alpha 1$. The vertical axis represents the ratio of amounts of warp d2/d1 of the base substrate 22. The ratio of coefficients of linear expansion $\alpha 2/\alpha 1$ in FIG. 9 is the value of the coefficient of linear expansion $\alpha 2$ of the second adhesive 38 and the third adhesive 39 standardized by the coefficient of linear expansion $\alpha 1$ of the first adhesive 18. The ratio of amounts of warp d2/d1 in FIG. 9 is the value of a maximum amount of warp d2 of the base substrate 22 generated when a temperature change of 125° C. is applied to the inertial sensor 1 having the coefficient of linear expansion $\alpha 2$ of the second adhesive 38 and the third adhesive 39 as a parameter, standardized by an amount of warp d1 of the base substrate 22 generated when the coefficient of linear expansion $\alpha 1$ of the first adhesive 18 and the coefficient of linear expansion $\alpha 2$ of the second adhesive 38 and the third adhesive 39 are the same. In FIG. 9, the coefficient of linear expansion of the second adhesive 38 and the coefficient of linear expansion of the third adhesive 39 are the same.

As shown in FIG. 9, the ratio of coefficients of linear expansion $\alpha 2/\alpha 1$ and the ratio of amounts of substrate warp d2/d1 are in direct proportion to each other. That is, employing an adhesive having the coefficient of linear expansion $\alpha 2$ lower than the coefficient of linear expansion $\alpha 1$ of the first adhesive 18, as the second adhesive 38 and the third adhesive 39 to bond together the first lateral surface 22c of the base substrate 22 and the first inner wall surface 12c of the package 7 and bond together the second lateral surface 22d of the base substrate 22 and the second inner wall surface 12d of the package 7, reduces the warp of the base substrate 22. That is, it is preferable that the coefficient of linear expansion $\alpha 2$ of the second adhesive 38 and the third adhesive 39 is lower than the coefficient of linear expansion $\alpha 1$ of the first adhesive 18. As the second adhesive 38 and the third adhesive 39 have the coefficient of linear expansion $\alpha 2$ lower than the coefficient of linear expansion $\alpha 1$ of the first adhesive 18, the expansion and contraction of the second adhesive 38 and the third adhesive 39 due to a temperature change is smaller than the expansion and contraction of the first adhesive 18. Therefore, the warp of the base substrate 22 caused by the first adhesive 18 is restrained by the second adhesive 38 and the third adhesive 39.

Also, it is preferable that the coefficient of linear expansion $\alpha 2$ of the second adhesive 38 and the third adhesive 39 is higher than the coefficient of linear expansion of the base substrate 22. Thus, the expansion and contraction of the second adhesive 38 and the third adhesive 39 due to a temperature change is greater than the extraction and contraction of the base substrate 22 and a tensile or compressive stress acts in a direction perpendicular to the direction of warp of the base substrate 22. Therefore, the warp of the base substrate 22 is restrained by the second adhesive 38 and the third adhesive 39.

Figures 10, 11:
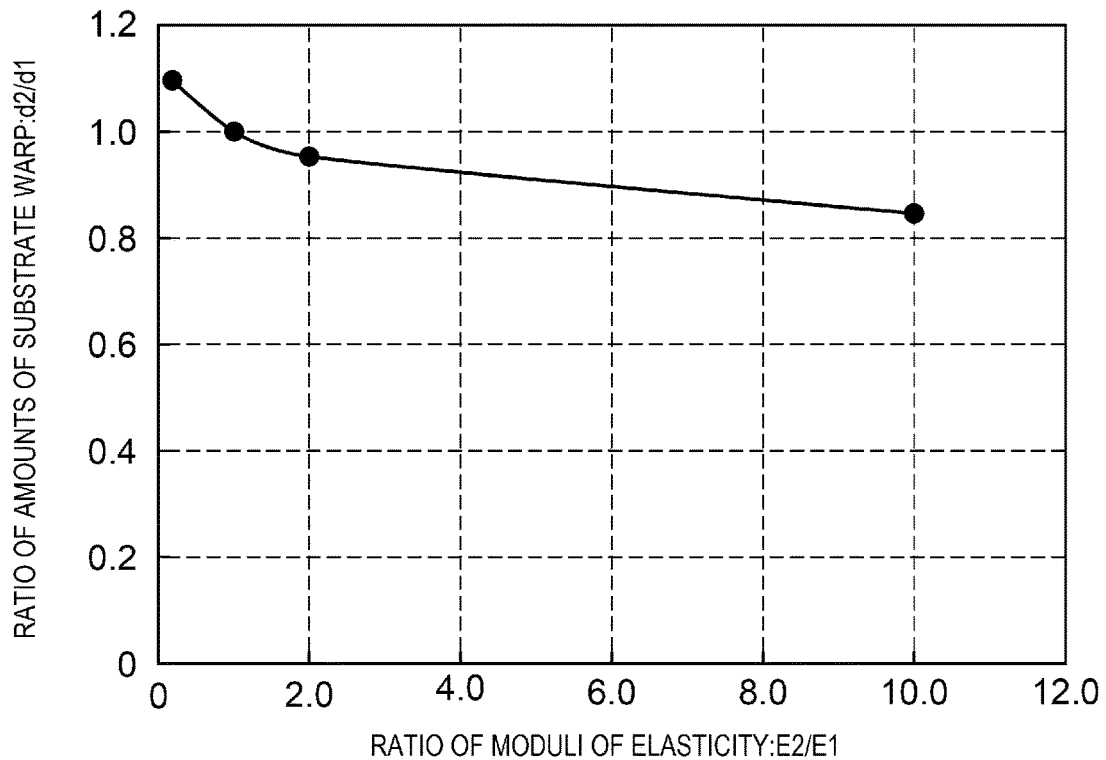
FIG. 10 is a graph showing the relationship between the ratio of moduli of elasticity and the ratio of amounts of substrate warp.
FIG. 11 is a table showing the moduli of elasticity and the coefficients of linear expansion of adhesives.

FIG. 10 is a graph showing the relationship between the ratio of moduli of elasticity and the ratio of amounts of substrate warp. The horizontal axis in FIG. 10 represents the ratio of moduli of elasticity E2/E1. The vertical axis represents the ratio of amounts of warp d2/d1 of the base substrate 22. The ratio of moduli of elasticity E2/E1 in FIG. 10 is the value of the modulus of elasticity E2 of the second adhesive 38 and the third adhesive 39 standardized by the modulus of elasticity E1 of the first adhesive 18. The ratio of amounts of substrate warp d2/d1 in FIG. 10 is the value of a maximum amount of warp d2 of the base substrate 22 generated when a temperature change of 125° C. is applied to the inertial sensor 1 having the modulus of elasticity E2 of the second adhesive 38 and the third adhesive 39 as a parameter, standardized by an amount of warp d1 of the base substrate 22 generated when the modulus of elasticity E1 of the first adhesive 18 and the modulus of elasticity E2 of the second adhesive 38 and the third adhesive 39 are the same. In FIG. 10, the modulus of elasticity of the second adhesive 38 and the modulus of elasticity of the third adhesive 39 are the same.

As shown in FIG. 10, the ratio of moduli of elasticity E2/E1 and the ratio of amounts of substrate warp d2/d1 are in inverse proportion to each other. That is, employing an adhesive having the modulus of elasticity E2 higher than the modulus of elasticity E1 of the first adhesive 18, as the second adhesive 38 and the third adhesive 39 to bond together the first lateral surface 22c of the base substrate 22 and the first inner wall surface 12c of the package 7 and bond together the second lateral surface 22d of the base substrate 22 and the second inner wall surface 12d of the package 7, reduces the warp of the base substrate 22. That is, it is preferable that the modulus of elasticity E2 of the second adhesive 38 and the third adhesive 39 is higher than the modulus of elasticity E1 of the first adhesive 18. As the second adhesive 38 and the third adhesive 39 have the modulus of elasticity E2 higher than the modulus of elasticity E1 of the first adhesive 18, the rigidity of the second adhesive 38 and the third adhesive 39 is higher than the rigidity of the first adhesive 18. Therefore, the warp of the base substrate 22 is restrained by the second adhesive 38 and the third adhesive 39.

FIG. 11 is a table showing the moduli of elasticity and the coefficients of linear expansion of adhesives. Adhesives A to E shown in FIG. 11 are representative examples used for manufacturing various electronic components. The adhesive A is an epoxy-based adhesive containing an epoxy resin as a main material. The adhesive A has a modulus of elasticity of 10 to 50 Gpa and a coefficient of linear expansion of 5 to 20 ppm/° C. The adhesive B is an epoxy-based adhesive having a different coefficient of linear expansion and a different modulus of elasticity from the adhesive A. The adhesive B has a modulus of elasticity of 2 to 6 Gpa and a coefficient of linear expansion of 30 to 60 ppm/° C. The adhesive C is a polyimide-based adhesive containing a polyimide resin as a main material. The adhesive C has a modulus of elasticity of 2 to 3 Gpa and a coefficient of linear expansion of 50 to 70 ppm/° C. The adhesive D is a silicone-based adhesive containing a silicone resin as a main material. The adhesive D has a modulus of elasticity of 0.0005 to 0.005 Gpa and a coefficient of linear expansion of 250 to 500 ppm/° C. The adhesive E is a polyurethane-based adhesive containing a polyurethane resin as a main material. The adhesive E has a modulus of elasticity of 0.07 to 0.7 Gpa and a coefficient of linear expansion of 100 to 200 ppm/° C.

As the first adhesive 18, one of the adhesives C to E is selected. As the second adhesive 38 and the third adhesive 39, one of the adhesives A and B is chosen. Thus, the coefficient of linear expansion α2 of the second adhesive 38 and the third adhesive 39 can be made lower than the coefficient of linear expansion α1 of the first adhesive 18, and the modulus of elasticity E2 of the second adhesive 38 and the third adhesive 39 can be made higher than the modulus of elasticity E1 of the first adhesive 18. Also, when a borosilicate glass is employed for the base substrate 22, the coefficient of the base substrate 22 is 3 to 8 ppm/° C. This enables the coefficient of linear expansion α2 of the second adhesive 38 to be higher than the coefficient of linear expansion of the base substrate 22 and thus can suitably restrain the warp of the base substrate 22.

Also, the adhesive B is selected as the first adhesive 18, and the adhesive A is selected as the second adhesive 38 and the third adhesive 39. Thus, the coefficient of linear expansion α2 of the second adhesive 38 and the third adhesive 39 can be made lower than the coefficient of linear expansion α1 of the first adhesive 18. The modulus of elasticity E2 of the second adhesive 38 and the third adhesive 39 can be made higher than the modulus of elasticity E1 of the first adhesive 18. The coefficient of linear expansion α2 of the second adhesive 38 and the third adhesive 39 can be made higher than the coefficient of linear expansion of the base substrate 22. Therefore, the warp of the base substrate 22 can be suitably restrained.

FIG. 12 a table showing the bonding positions with the second adhesive and the third adhesive and the amounts of warp of the base substrate. The first row in FIG. 12 shows bonding states "no bonding", "two-side bonding", and "four-side bonding" with the second adhesive 38 and the third adhesive 39. The second row in FIG. 12 shows the amounts of warp of the base substrate 22 generated when the same temperature change as described above is applied. The third row in FIG. 12 shows schematic plan views showing the bonding states with the second adhesive 38 and the third adhesive 39. The fourth row in FIG. 12 shows schematic cross-sectional views showing the bonding states with the second adhesive 38 and the third adhesive 39. The amounts of warp of the base substrate represent values standardized by the amount of warp corresponding to the "no bonding" state. The amounts of warp shown in FIG. 12 are the results of employing the adhesive B as the first adhesive 18 and employing the adhesive A as the second adhesive 38 and the third adhesive 39. In FIG. 12, only the base unit 10 of the package 7, the base substrate 22, and the first to third adhesives 18, 38, 39 are shown.

The "no bonding" represents an inertial sensor having the related-art configuration, in which only the bottom surface of the base substrate 22 of the acceleration sensor element 20 is bonded to the inner bottom surface 11a of the base unit 10 with the first adhesive 18 using the adhesive B.

In the "two-side bonding", the first lateral surface 22c of the base substrate 22 and the first inner wall surface 12c of the base unit 10 are bonded together with the second adhesive 38 using the adhesive A, and the second lateral surface 22d of the base substrate 22 and the second inner wall surface 12d of the base unit 10 are bonded together with the third adhesive 39 using the adhesive A, in addition to the "no bonding". The base substrate 22 in this embodiment is in the shape of a rectangle having a first shorter side and a second shorter side opposite the first shorter side, as viewed in a plan view from the direction of thickness of the base substrate 22. The first lateral surface 22c corresponds to the first shorter side. The second lateral surface 22d corresponds to the second shorter side. When the base substrate 22 is a rectangle, the warp generated along the longer sides is larger than the warp generated along the shorter sides. Therefore, the amount of warp generated in the base substrate 22 can be effectively restrained. Thus, the amount of warp of the base substrate 22 in the "two-side bonding" inertial sensor 1 is improved by 17%, compared with the amount of warp of the base substrate 22 in the "no bonding" inertial sensor.

The base substrate 22 has a third lateral surface 22e intersecting the top surface 22a and adjacent to the first lateral surface 22c and the second lateral surface 22d, and a fourth lateral surface 22f intersecting the top surface 22a and adjacent to the first lateral surface 22c and the second lateral surface 22d and opposite to the third lateral surface 22e.

The base unit 10 of the package 7 has a third inner wall surface 12e intersecting the inner bottom surface 11a and adjacent to the first inner wall surface 12c and the second inner wall surface 12d, and a fourth inner wall surface 12f intersecting the inner bottom surface 11a and adjacent to the first inner wall surface 12c and the second inner wall surface 12d and opposite to the third inner wall surface 12e.

In the "four-side bonding", the second adhesive 38 extends between the third lateral surface 22e and the third inner wall surface 12e and bonds together the third lateral surface 22e and the third inner wall surface 12e. The second adhesive 38 extends between the fourth lateral surface 21f and the fourth inner wall surface 12f and bonds together the fourth lateral surface 21f and the fourth inner wall surface 12f.

That is, in the "four-side bonding", the third lateral surface 22e of the base substrate 22 and the third inner wall surface 12e of the base unit 10 are bonded together with the second adhesive 38 using the adhesive A, and the fourth lateral surface 22f of the base substrate 22 and the fourth inner wall surface 12f of the base unit 10 are bonded together with the second adhesive 38 using the adhesive A, in addition to the "two-side bonding". Thus, the amount of warp of the base substrate 22 in the "four-side bonding" inertial sensor is improved by 15%, compared with the "no bonding". The amount of warp of the base substrate 22 in the "four-side bonding" inertial sensor and the amount of warp of the base substrate in the "two-side bonding" inertial sensor 1 are substantially the same. Therefore, the inertial sensor 1 may be the "four-side bonding" inertial sensor and achieves effects similar to those of the "two-side bonding" inertial sensor 1.

In this embodiment, the inertial sensor 1 having the acceleration sensor element 20 as one sensor element accommodated in one package 7 is described as an example. However, an inertial sensor having a plurality of sensor elements accommodated in one package 7 may be employed. For example, in the case of an inertial sensor having a first sensor element and a second sensor element accommodated in the package, the second adhesive 38 bonds together the lateral surfaces of the base substrates 22 of the first and second sensor elements and the inner wall surface of the package 7. The third adhesive 39 bonds together the lateral surface of the base substrate 22 of the first sensor element and the lateral surface of the base substrate 22 of the second sensor element, instead of bonding together the lateral surfaces of the base substrates 22 of the first and second sensor elements and the inner wall surface of the package 7. Even the inertial sensor of such a configuration is included in the present disclosure and achieves effects similar to those of the foregoing inertial sensor 1.

Figure 13:
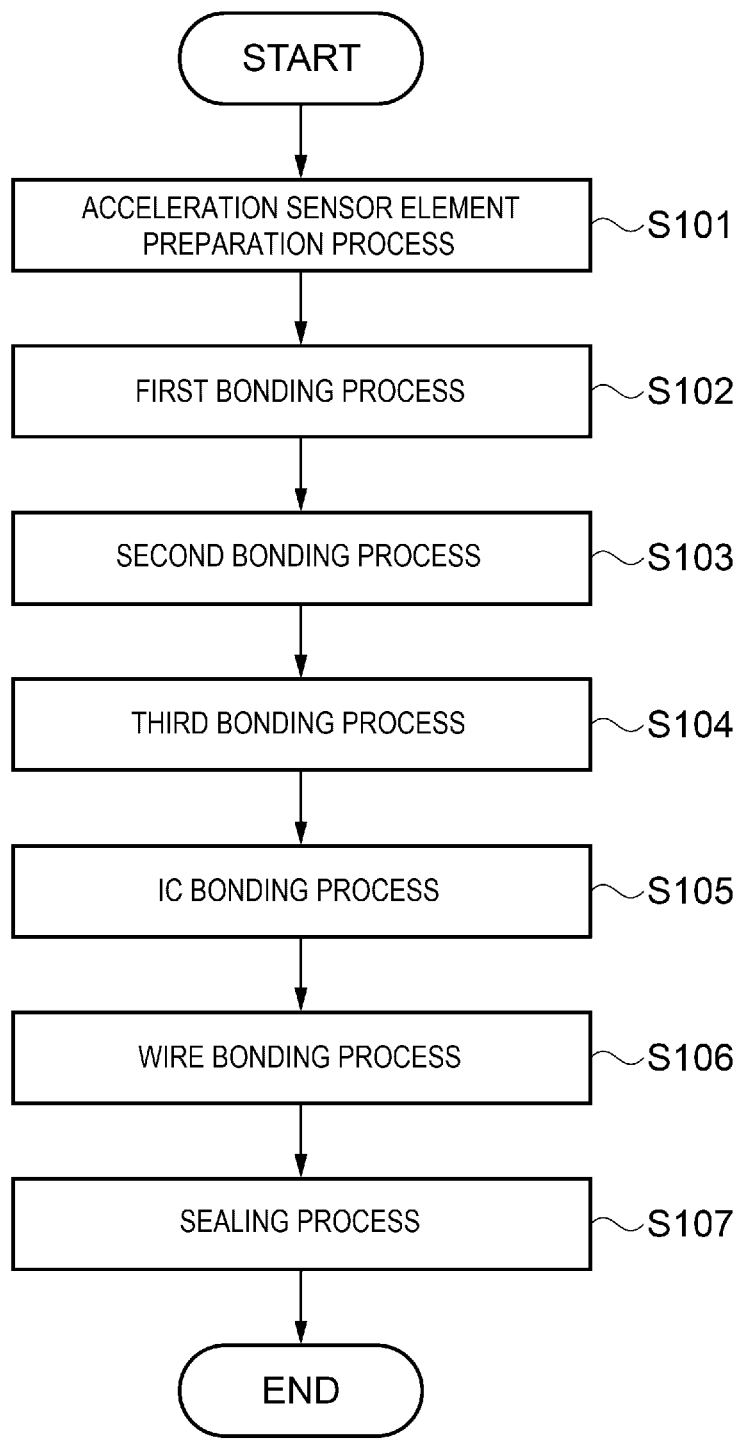
FIG. 13 is a flowchart showing a process of manufacturing the inertial sensor.

The method for manufacturing the inertial sensor 1 will now be described. FIG. 13 is a flowchart showing the process of manufacturing the inertial sensor. FIGS. 14 to 19 are cross-sectional views explaining the process of manufacturing the inertial sensor.

Step S101 is an acceleration sensor element preparation process in which the acceleration sensor element 20 is prepared. In this process, the acceleration sensor element 20 having the base substrate 22 and the X-axis, Y-axis, and Z-axis sensor units 21x, 21y, 21z arranged at the top surface 22a of the base substrate 22 is prepared.

Figure 14:
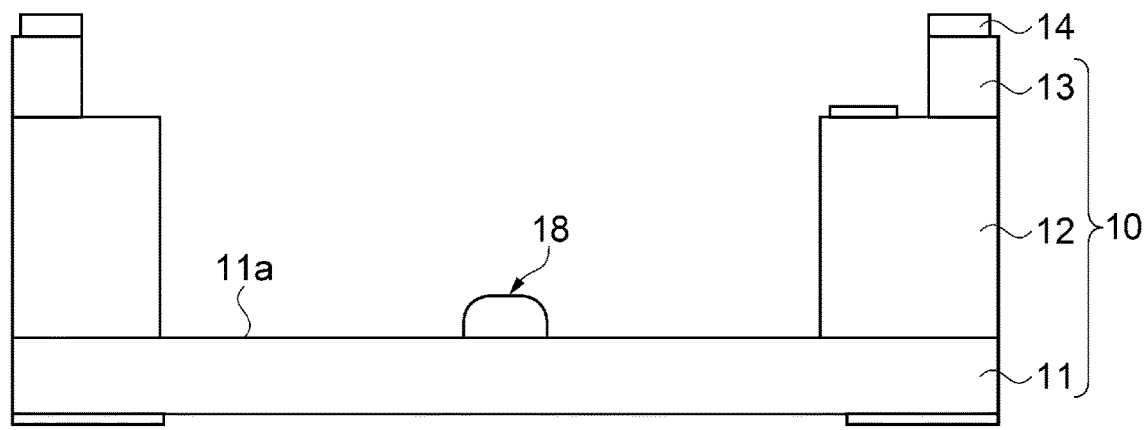
FIG. 14 is a cross-sectional view explaining the process of manufacturing the inertial sensor.
Figure 14:
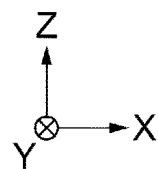
Figure 15:
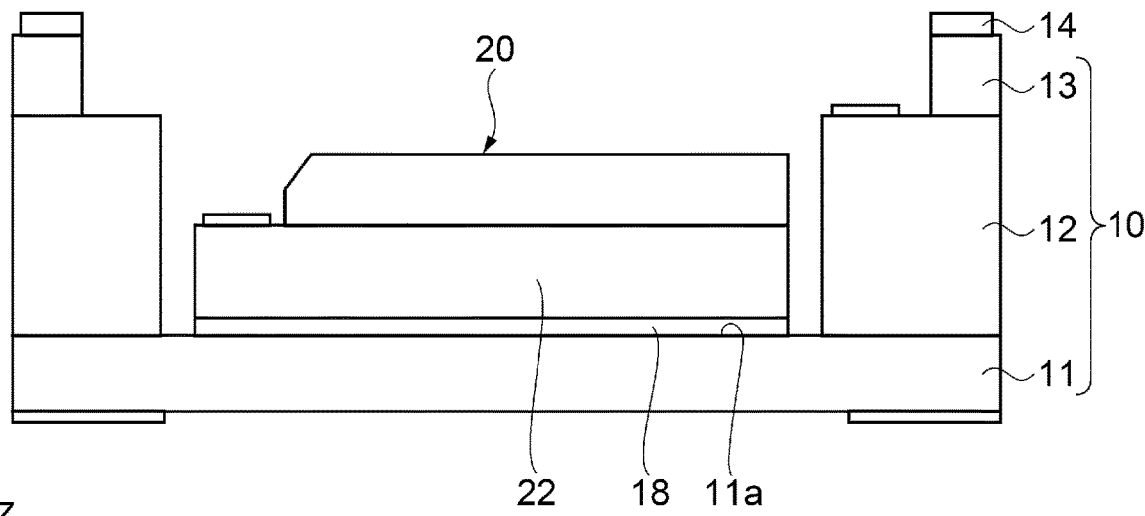
FIG. 15 is a cross-sectional view explaining the process of manufacturing the inertial sensor.
Figure 15:
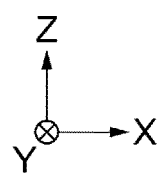

Step S102 is a first bonding process in which the back surface 22b of the base substrate 22 and the inner bottom surface 11a of the base unit 10 of the package 7 are bonded together with the first adhesive 18. In this process, as shown in FIG. 14, the first adhesive 18 is applied at the center of the inner bottom surface 11a of the base unit 10, using a die bonder device or the like, and the acceleration sensor element 20 is mounted on the applied first adhesive 18. Thus, the first adhesive 18 spreads between the base substrate 22 and the inner bottom surface 11a of the base unit 10, as shown in FIG. 15. The first adhesive 18 is hardened under a predetermined condition.

Step S103 is a second bonding process in which the first lateral surface 22c of the base substrate 22 and the first inner wall surface 12c of the base unit 10 are bonded together with the second adhesive 38. In this process, the second adhesive 38 is applied between the first lateral surface 22c and the first inner wall surface 12c, using a coating device such as a dispenser. The second adhesive 38 is hardened under a predetermined condition.

Figure 16:
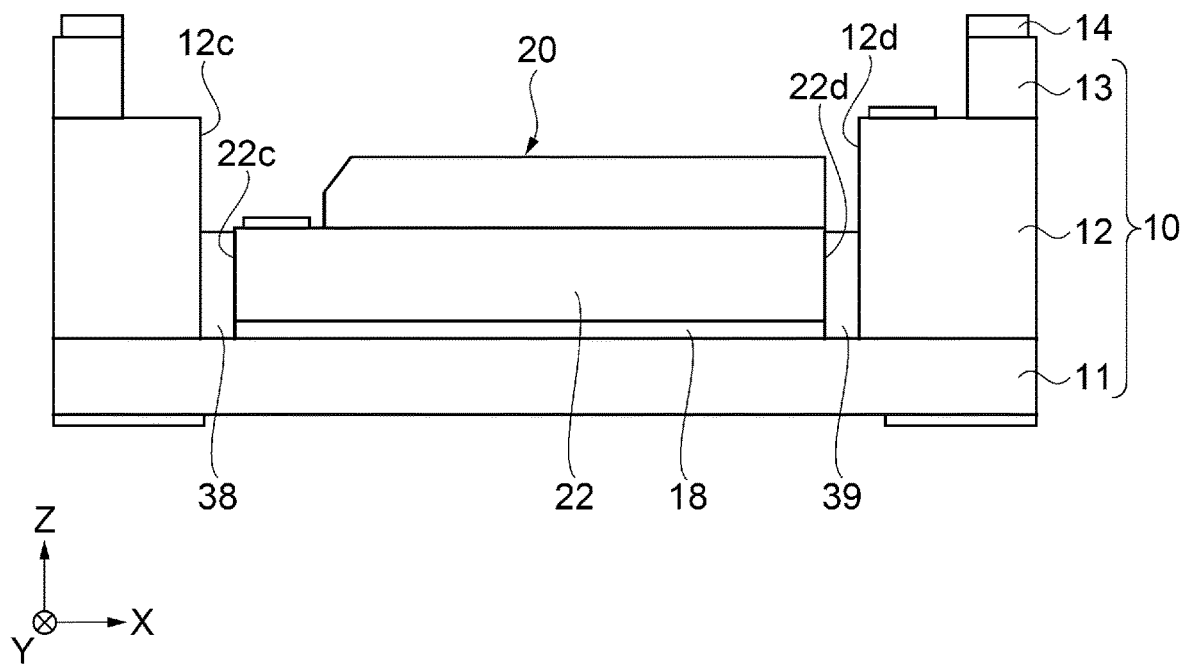
FIG. 16 is a cross-sectional view explaining the process of manufacturing the inertial sensor.

Step S104 is a third bonding process in which the second lateral surface 22d of the base substrate 22 and the second inner wall surface 12d of the base unit 10 are bonded together with the third adhesive 39. In this process, the third adhesive 39 is applied between the second lateral surface 22d and the second inner wall surface 12d, using a coating device such as a dispenser. The third adhesive 39 is hardened under a predetermined condition. FIG. 16 shows the configuration after the third bonding process. When the same adhesive is employed as the second adhesive 38 and the third adhesive 39, step S103 and step S104 can be carried out simultaneously.

Figure 17:
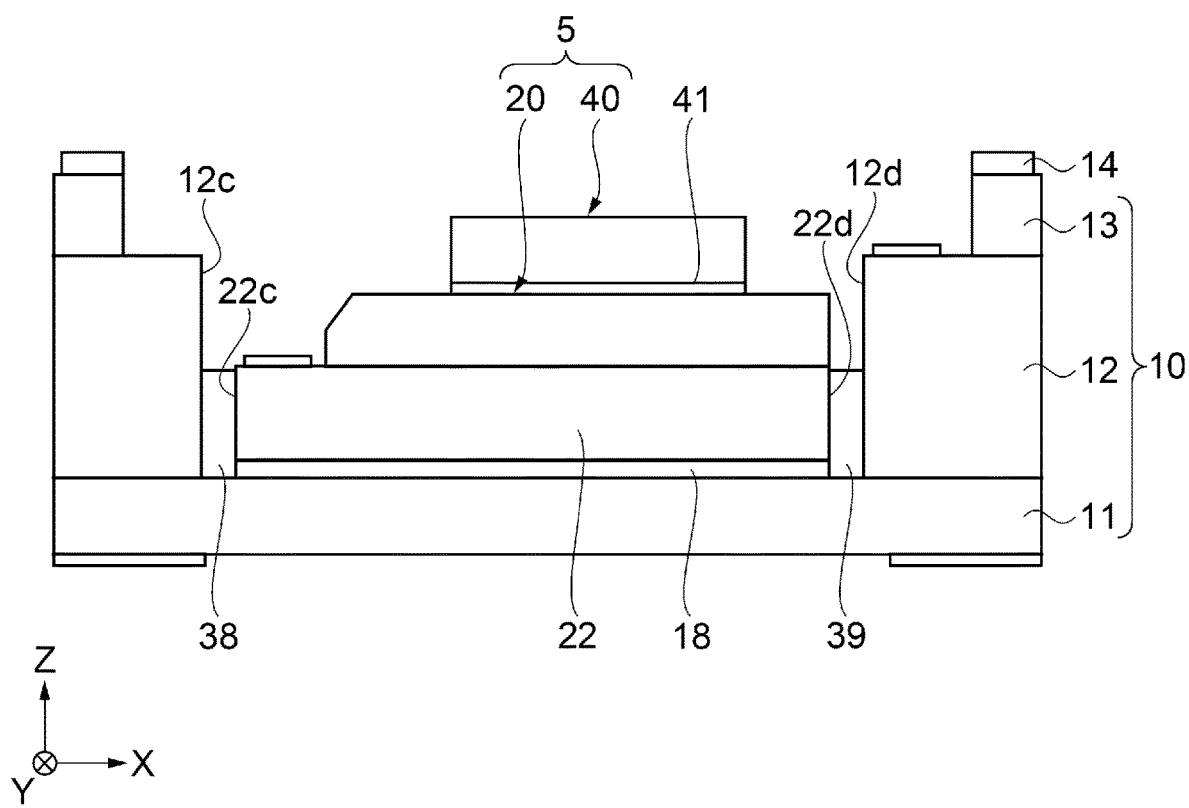
FIG. 17 is a cross-sectional view explaining the process of manufacturing the inertial sensor.

Step S105 is an IC bonding process in which the acceleration sensor element 20 and the IC 40 are bonded together. In this process, as shown in FIG. 17, an adhesive is applied to the top surface of the acceleration sensor element 20, using a coating device such as a dispenser, and the IC 40 is mounted on the applied adhesive to form the adhesive layer 41. The adhesive is then hardened under a predetermined condition.

Figure 18:
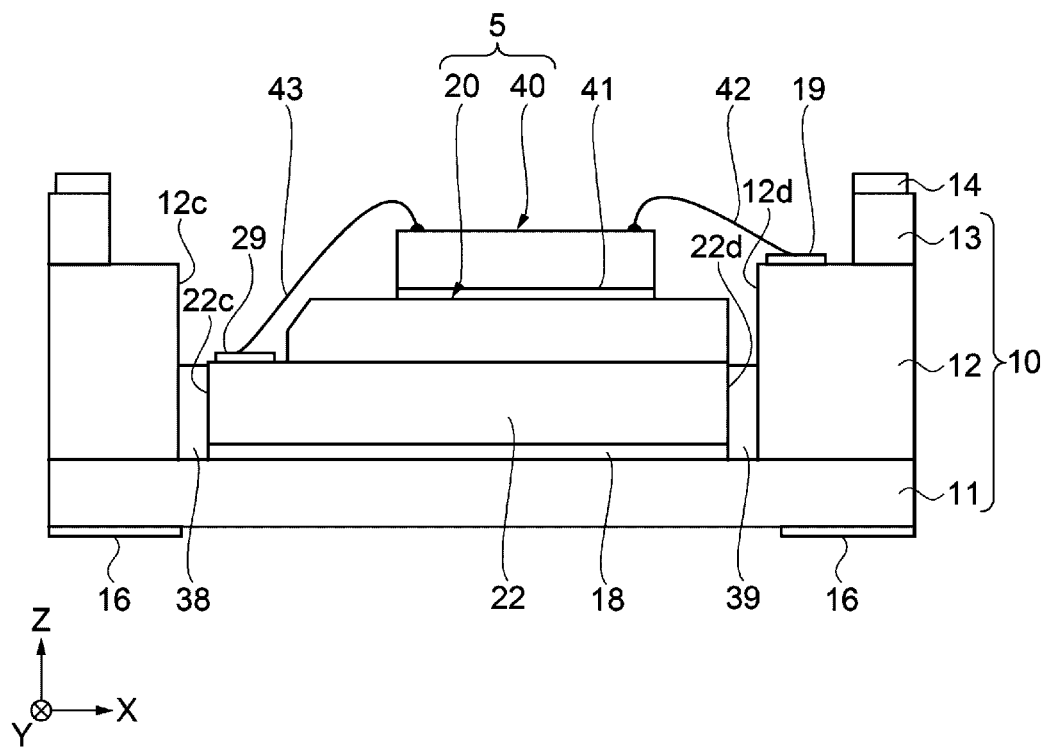
FIG. 18 is a cross-sectional view explaining the process of manufacturing the inertial sensor.

Step S106 is a wire bonding process in which wire bonding is performed. In this process, as shown in FIG. 18, the electrode pad of the IC 40 and the coupling terminal 29 of the acceleration sensor element 20 are electrically coupled together via the bonding wire 43, using a wire bonder device. Also, the electrode pad of the IC 40 and the internal terminal 19 of the base unit 10 are electrically coupled together via the bonding wire 42. Thus, the IC 40 is electrically coupled to the external terminal 16 via the internal wiring formed in the base unit 10.

Figure 19:
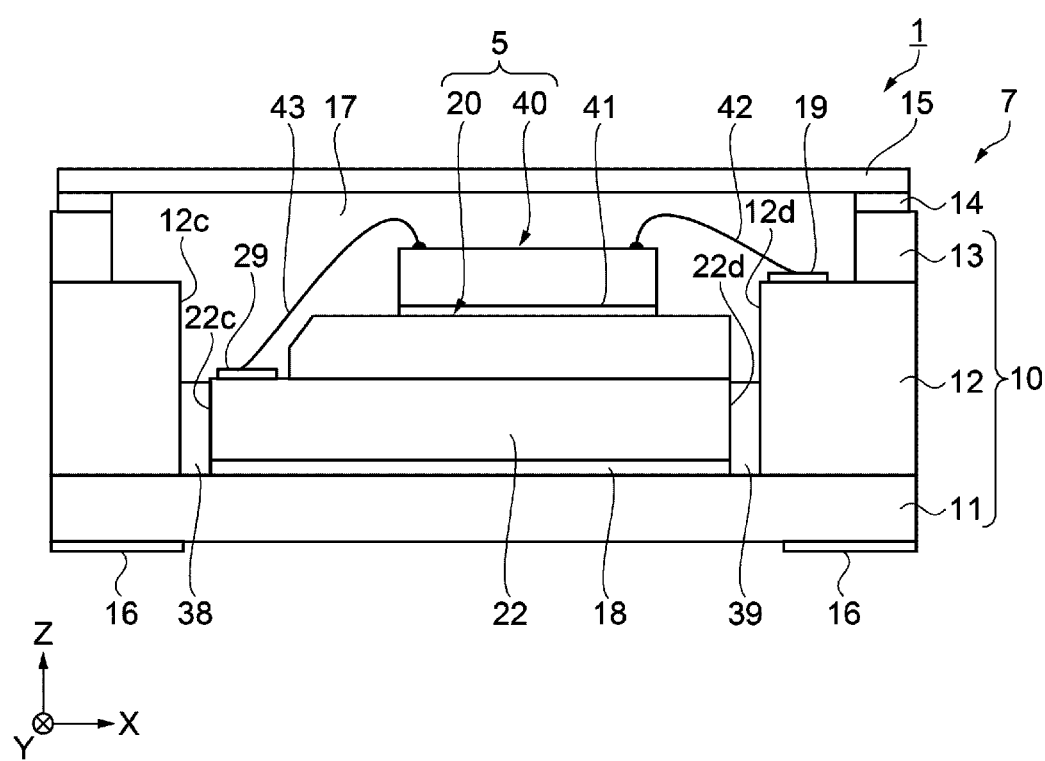
FIG. 19 is a cross-sectional view explaining the process of manufacturing the inertial sensor.

Step S107 is a sealing process in which the opening of the base unit 10 is closed by the lid 15. In this process, for example, when a seal ring is used as the sealing member 14 and a metal material is used for the lid 15, the sealing member 14 and the lid 15 are bonded together by resistance welding using a seam welder, as shown in FIG. 19. Thus, the inertial sensor 1 is provided.

In the above method for manufacturing the inertial sensor 1, the second adhesive 38 and the third adhesive 39 contract in volume due to hardening after being applied. Therefore, a tensile stress acts in the horizontal direction along the top surface 22*a* of the base substrate 22. This tensile stress can restrain the base substrate 22 from warping due to the expansion and contraction of the first adhesive 18 when a temperature change is applied to the inertial sensor 1.

2. Embodiment 2

Figure 20:
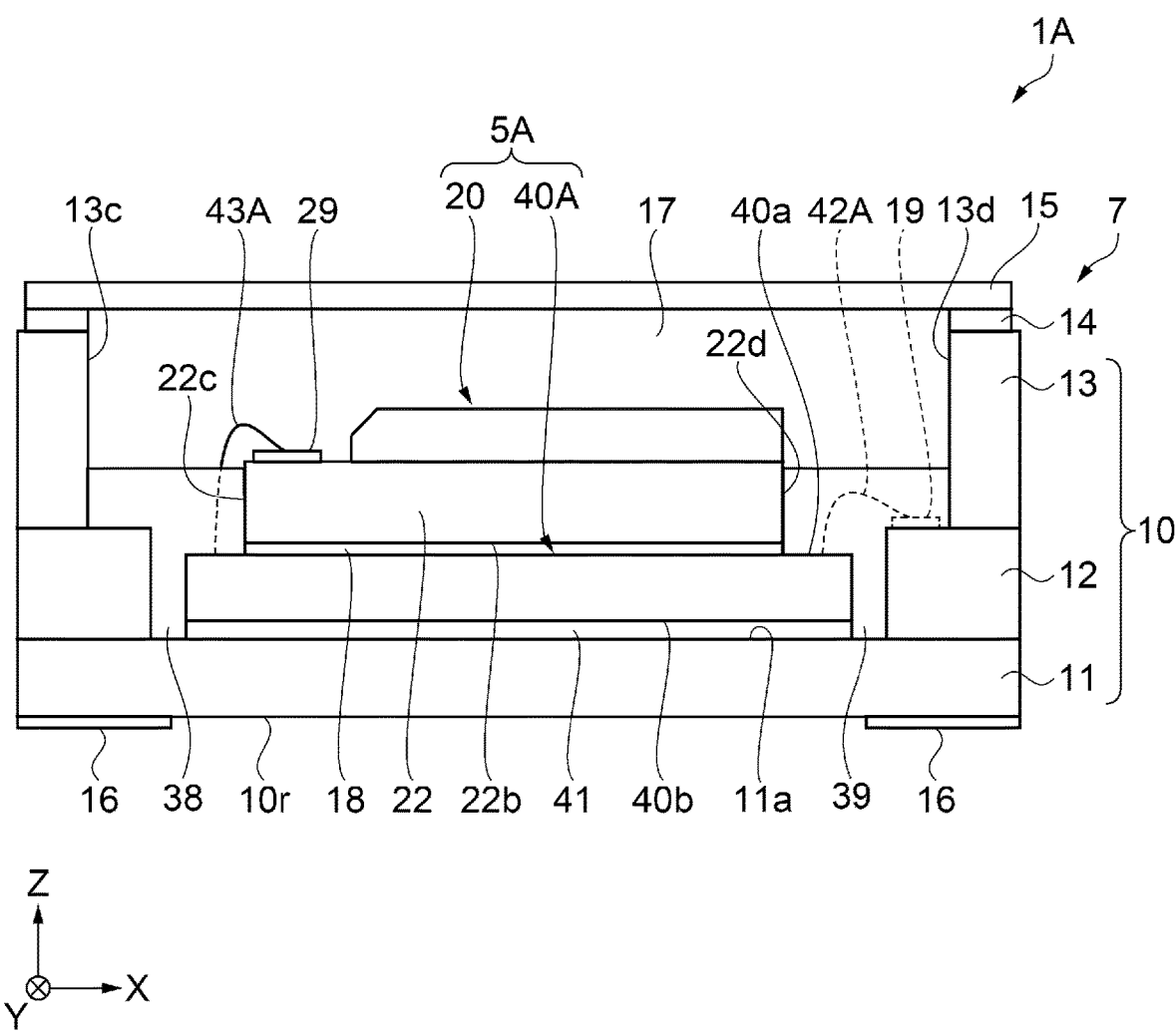
FIG. 20 is a cross-sectional view showing a schematic configuration of an inertial sensor according to Embodiment 2.

An inertial sensor according to Embodiment 2 will now be described with reference to FIG. 20. FIG. 20 is a cross-sectional view showing a schematic configuration of the inertial sensor according to Embodiment 2. In the description below, the X-axis, the Y-axis, and the Z-axis are used as three axes orthogonal to each other, as in Embodiment 1. The same components as in Embodiment 1 are denoted by the same reference numbers and are not described further in detail.

An inertial sensor 1A shown in FIG. 20 can be used as a three-axis acceleration sensor which separately detects accelerations along the X-axis, the Y-axis, and the Z-axis. The inertial sensor 1A has a structure 5A and the package 7 accommodating the structure 5A. The structure 5A has an IC (integrated circuit) 40A and the acceleration sensor element 20 as a sensor element arranged at the top of the IC 40A. A bottom surface 40*b* of the IC 40A is bonded to the inner bottom surface 11*a* of the package 7 via the adhesive layer 41. A top surface 40*a* of the IC 40A is bonded to the back surface 22*b* of the base substrate 22 of the acceleration sensor element 20 with the first adhesive 18. That is, in Embodiment 2, the IC 40A is equivalent to the substrate where the acceleration sensor element 20 is installed.

The package 7 has a first inner wall surface 13*c* intersecting the inner bottom surface 11*a* and opposite the first lateral surface 22*c* of the base substrate 22, and a second inner wall surface 13*d* intersecting the inner bottom surface 11*a* and opposite the second lateral surface 22*d* of the base substrate 22. The space between the first lateral surface 22*c* of the base substrate 22 and the first inner wall surface 13*c* of the package 7, and the space below the space between the first lateral surface 22*c* and the first inner wall surface 13*c*, are filled with the second adhesive 38. The space between the second lateral surface 22*d* of the base substrate 22 and the second inner wall surface 13*d* of the package 7, and the space below the space between the second lateral surface 22*d* and the second inner wall surface 13*d*, are filled with the third adhesive 39.

The acceleration sensor element 20 and the IC 40A, forming the structure 5A, are electrically coupled together via a bonding wire 43A. The IC 40A is also electrically coupled to the internal terminal 19 provided in the package 7, via a bonding wire 42A.

The IC 40A includes, for example, a drive circuit driving the acceleration sensor element 20, the signal processing unit 45 detecting an acceleration along each of the X-axis, the Y-axis, and the Z-axis, based on a signal from the acceleration sensor element 20, and the output unit 46 converting a signal from a detection circuit into a predetermined signal and outputting the predetermined signal, or the like. The IC 40A has a plurality of electrode pads at a top surface thereof. Each electrode pad is electrically coupled to the internal terminal 19 of the second base member 12 via a bonding wire 42A. Each electrode pad is electrically coupled to the coupling terminal 29 of the acceleration sensor element 20 via the bonding wire 43A. Thus, the acceleration sensor element 20 can be controlled.

In the inertial sensor 1A according to this embodiment, the first lateral surface 22*c* of the base substrate 22 and the first inner wall surface 13*c* of the package 7 are bonded together with the second adhesive 38, and the second lateral surface 22*d* of the base substrate 22 and the second inner wall surface 13*d* of the package 7 are bonded together with the third adhesive 39. The second adhesive 38 and the third adhesive 39 expand and contract in volume due to hardening after being applied. Therefore, a tensile stress acts in the horizontal direction along the top surface 22*a* of the base substrate 22. This tensile stress can restrain the base substrate 22 from warping due to the expansion and contraction of the first adhesive 18 when a temperature change is applied to the inertial sensor 1A.

3. Embodiment 3

Figure 21:
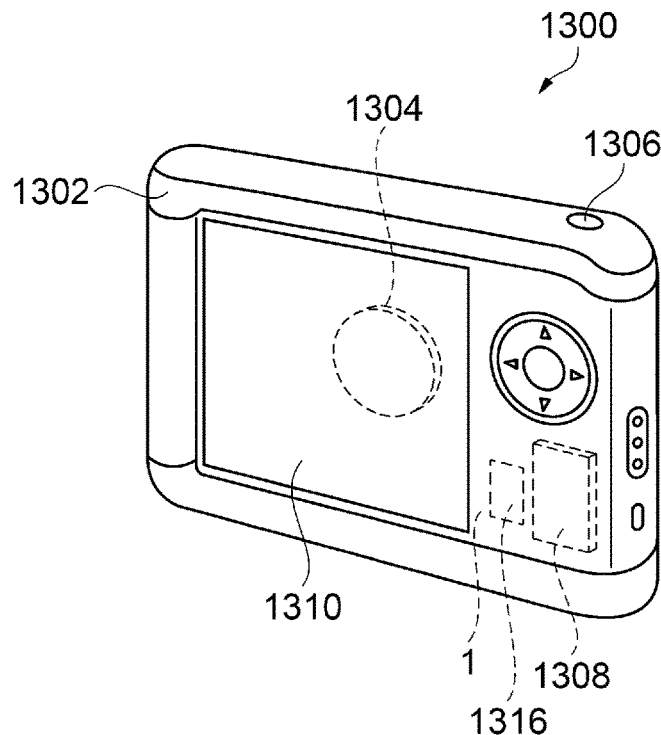
FIG. 21 is a perspective view showing an example of a digital still camera according to Embodiment 3.

FIG. 21 is a perspective view showing an example of a digital still camera according to Embodiment 3. A digital still camera 1300, as an electronic apparatus, photoelectrically converts an optical image of a subject via an image pickup element such as a CCD (charge-coupled device) and thus generates a pickup image signal.

A display unit 1310 is provided at the back side of a case 1302 of the digital still camera 1300, to display an image based on the pickup image signal from the CCD. The display unit 1310 functions as a viewfinder showing a subject as an electronic image. At the front of the case 1302, a light receiving unit 1304 including an optical lens and a CCD or the like is provided.

As a camera operator checks a subject image displayed on the display unit 1310 and presses a shutter button 1306, a pickup image signal from the CCD at that point is transferred to and stored into a memory 1308. In response to a predetermined operation, the pickup image signal stored in the memory 1308 is outputted to the display unit 1310 or to an external device that is wirelessly coupled or wired. The inertial sensor 1 functioning as an acceleration sensor is built in such a digital still camera 1300. Based on a detection signal outputted from the inertial sensor 1, a control circuit 1316 can perform control such as camera shake correction. The digital still camera 1300 can have the effects of the inertial sensor 1 and can achieve high reliability.

The electronic apparatus having the inertial sensor 1 according to the present disclosure can be applied not only to the digital still camera described in Embodiment 3 but also to other devices such as a personal computer, smartphone, inkjet printer, tablet computer, television, digital video camera, Blu-ray recorder, car navigation device, electronic organizer, electronic dictionary, electronic calculator, electronic game device, workstation, videophone, security monitor, electronic binoculars, POS terminal, medical equipment, fishfinder, various measuring devices, various instruments, and flight simulator. The medical equipment can be, for example, an electronic body thermometer, blood pressure monitor, blood sugar monitor, electrocardiograph, ultrasonic diagnostic device, electronic endoscope, or the like. The instruments can be, for example, instruments for wheeled vehicle, aircraft, ship or the like.

4. Embodiment 4

Figure 22:
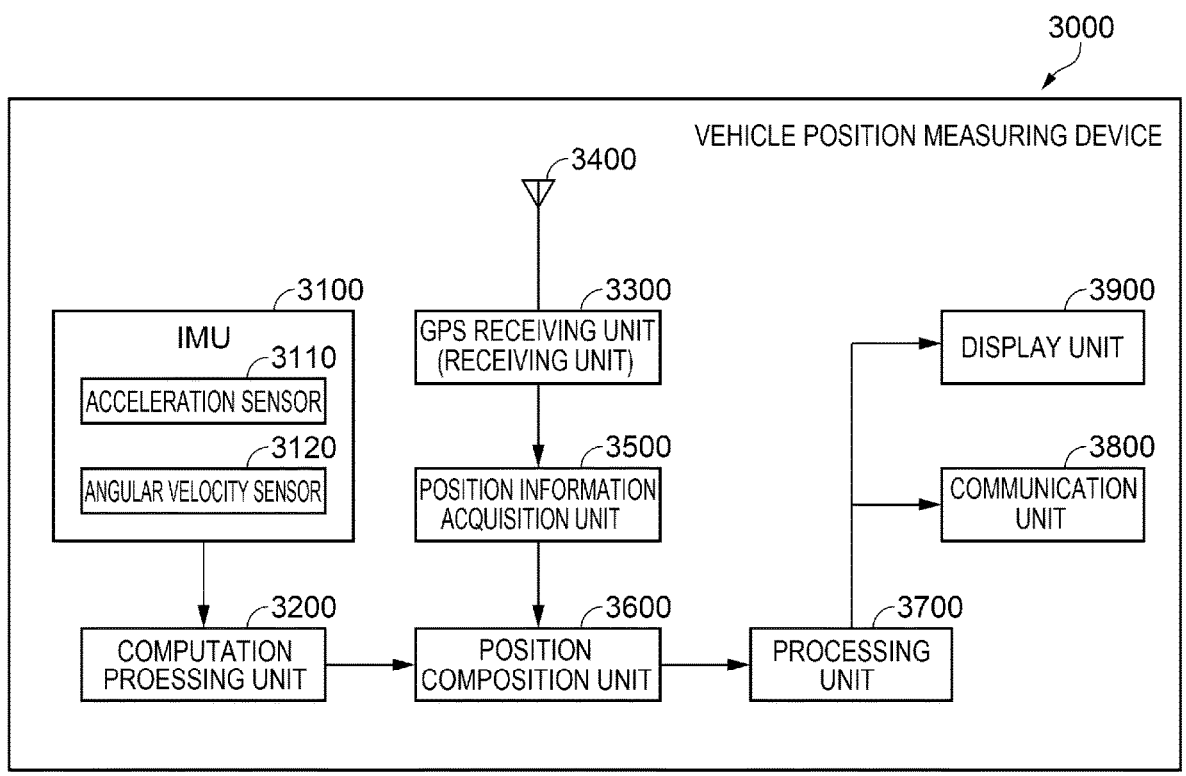
FIG. 22 is a block diagram showing an overall system of a vehicle position measuring device according to Embodiment 4.
Figure 23:
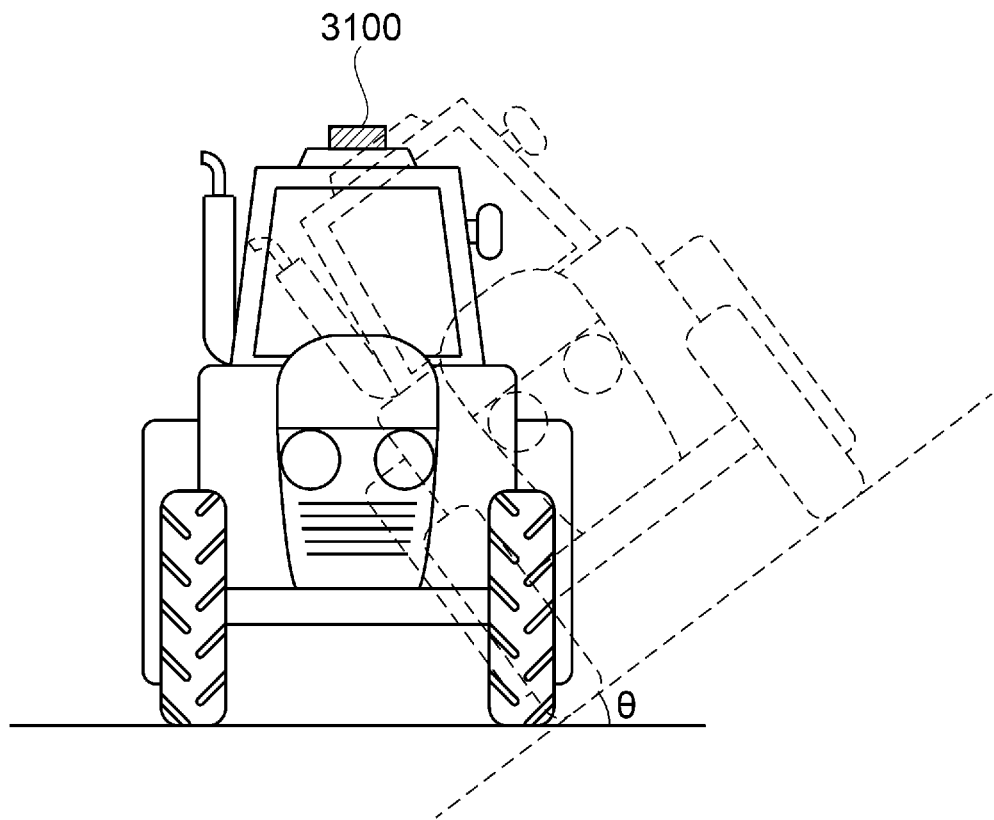
FIG. 23 schematically shows the operation of the vehicle position measuring device.

A vehicle position measuring device as an example of the electronic apparatus will now be described with reference to FIGS. 22 and 23. FIG. 22 is a block diagram showing an overall system of a vehicle position measuring device according to Embodiment 4. FIG. 23 schematically shows the operation of the vehicle position measuring device.

A vehicle position measuring device 3000 shown in FIG. 22 is a device installed and used on a vehicle in order to measure the position of the vehicle. The vehicle is not particularly limited and may be any of a bicycle, automobile, train, airplane, ship, and the like. In this embodiment, a four-wheeled automobile is employed as the vehicle. The vehicle position measuring device 3000 has an inertial measurement unit 3100, a computation processing unit 3200, a GPS receiving unit 3300, a receiving antenna 3400, a position information acquisition unit 3500, a position composition unit 3600, a processing unit 3700, a communication unit 3800, and a display unit 3900.

The inertial measurement unit 3100 has an acceleration sensor 3110 for three axes to which the inertial sensor 1 is applied, and an angular velocity sensor 3120 for three axes. The computation processing unit 3200 receives acceleration data from the acceleration sensor 3110 and angular velocity data from the angular velocity sensor 3120, carries out inertial navigation processing on these data, and outputs inertial navigation positioning data including the acceleration and attitude of the vehicle.

The GPS (Global Positioning System) is a satellite positioning system for measuring the current position on earth, based on a plurality of satellite signals. The GPS has the function of performing positioning calculation using GPS time information and trajectory information and thus acquiring position information of a user, the function of measuring the distance travelled by the user and the trajectory of movement, and the time correction function included in the timepiece function. The position information acquisition unit 3500 can measure the current position on earth, based on satellite signals from GPS satellites received by the GPS receiving unit 3300.

The position composition unit 3600 calculates the position of the vehicle, specifically, which position on the ground the vehicle is travelling at, based on inertial navigation positioning data outputted from the computation processing unit 3200 and GPS positioning data outputted from the position information acquisition unit 3500. For example, even when the position of the vehicle included in the GPS positioning data is the same, if the attitude of vehicle is different due to the influence of the slope or the like on the ground, as shown in FIG. 23, the vehicle is regarded as travelling at a different position on the ground. Therefore, the accurate position of the vehicle cannot be calculated, simply based on the GPS positioning data. Thus, the position composition unit 3600 calculates which position on the ground the vehicle is travelling at, using the inertial navigation positioning data. This calculation can be carried out relatively easily, by calculating a slope 6 to the vertical direction using trigonometric functions.

The position data outputted from the position composition unit 3600 is processed in a predetermined manner by the processing unit 3700 and the processed position data is displayed as the result of position measurement at the display unit 3900. The position data may also be transmitted to an external device by the communication unit 3800. The computation processing unit 3200 is equivalent to a control circuit performing control based on acceleration data as a detection signal outputted from the acceleration sensor 3110, which is the inertial sensor 1.

The vehicle position measuring device 3000 has been described. As described above, such a vehicle position measuring device 3000 includes: the inertial measurement unit 3100, to which the inertial sensor 1 is applied; the GPS receiving unit 3300 receiving a satellite signal with GPS time information and trajectory information superimposed thereon, from a positioning satellite; the position information acquisition unit 3500 acquiring position information of the GPS receiving unit 3300, based on the received satellite signal; the computation processing unit 3200 computing the attitude of the vehicle, based on inertial navigation positioning data outputted from the inertial measurement unit 3100; and the position composition unit 3600 correcting the position information, based on the calculated attitude, and thus calculating the position of the vehicle. Thus, the vehicle position measuring device 3000 can have the effects of the inertial sensor 1 and can achieve high reliability.

5. Embodiment 5

Figure 24:
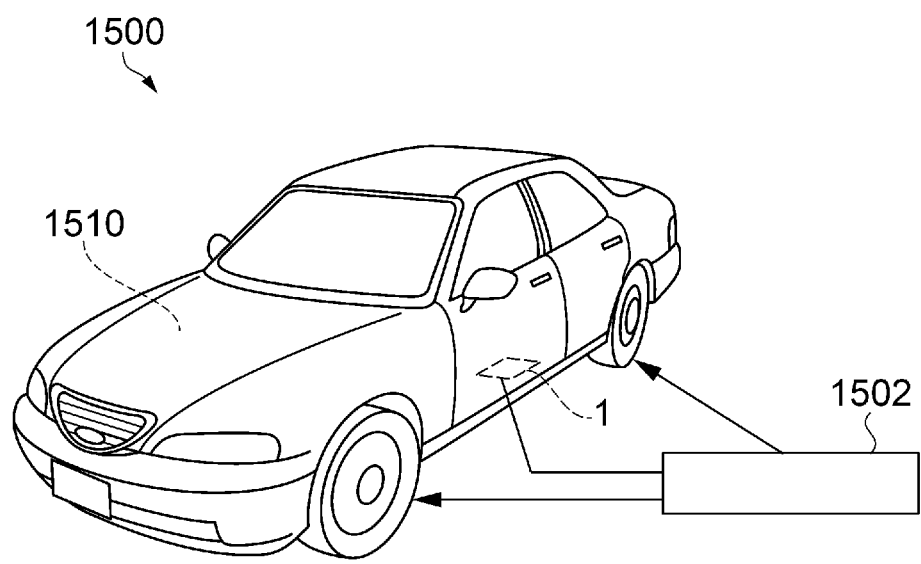
FIG. 24 is a perspective view showing the configuration of an automobile according to Embodiment 5.

FIG. 24 is a perspective view showing the configuration of an automobile according to Embodiment 5.

A system 1510 which is at least one of an engine system, a brake system, and a keyless entry system, the inertial sensor 1, and a control circuit 1502 are built in an automobile 1500 shown in FIG. 24. The inertial sensor 1 can detect the attitude of the vehicle body. A detection signal from the inertial sensor 1 is supplied to a control circuit 1502. Based on the signal, the control circuit 1502 can control the system 1510.

In this way, the automobile 1500 as a vehicle has the inertial sensor 1 and the control circuit 1502 performing control based on a detection signal outputted from the inertial sensor 1. Therefore, the automobile 1500 can have the effects of the inertial sensor 1 and can achieve high reliability.

The inertial sensor 1 can also be broadly applied to a car navigation system, car air-conditioning, anti-lock braking system (ABS), airbags, tire pressure monitoring system (TPMS), engine control, and electronic control unit (ECU) such as battery monitor for hybrid car or electric vehicle. The vehicle is not limited to the automobile 1500. For example, an airplane, rocket, artificial satellite, ship, automated guided vehicle (AGV), bipedal robot, unmanned aircraft such as drone, or the like can be employed.

6. Embodiment 6

Figure 25:
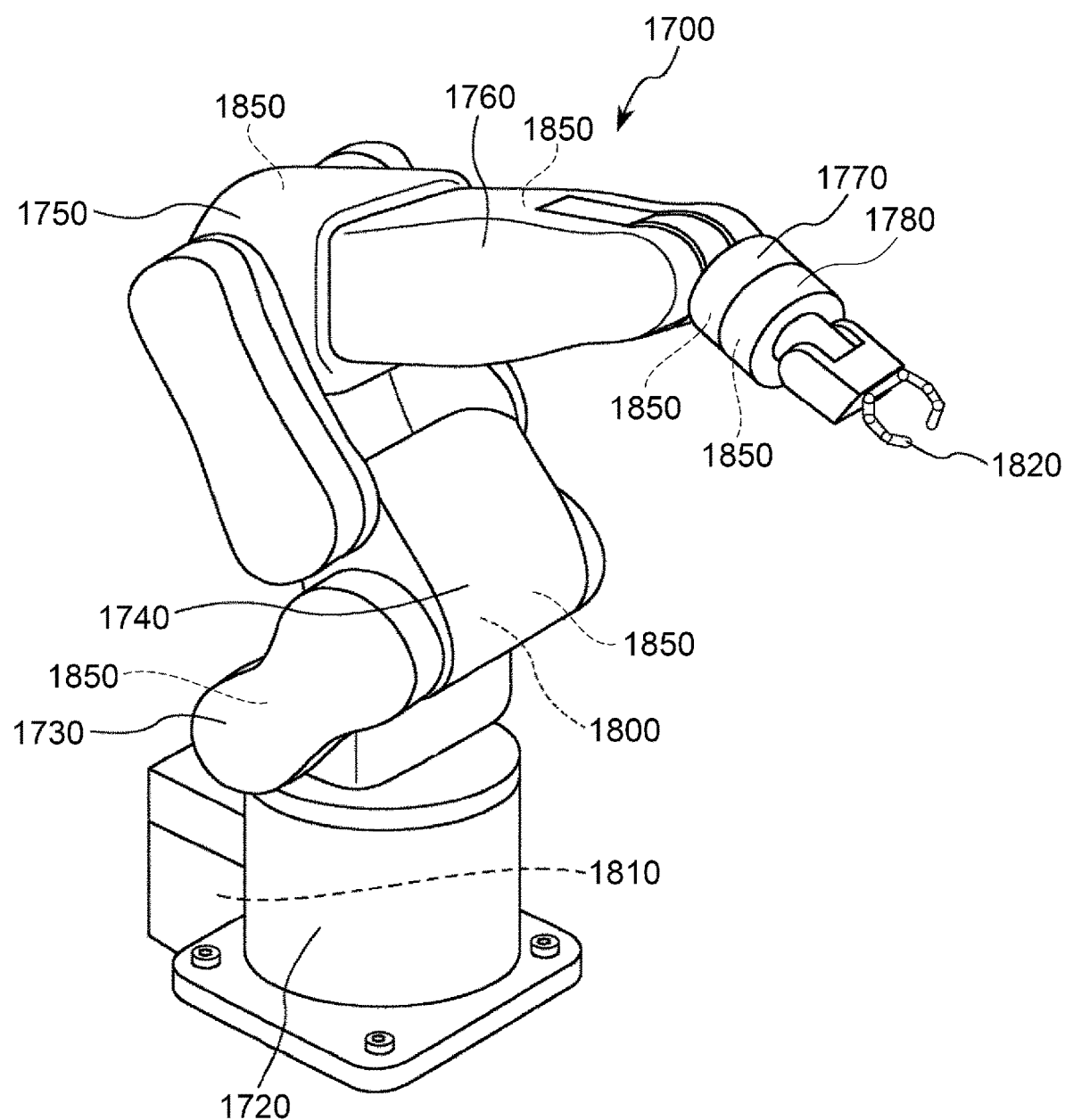
FIG. 25 is a perspective view showing the configuration of a robot according to Embodiment 6.

FIG. 25 is a perspective view showing the configuration of a robot according to Embodiment 6.

A robot 1700 as an electronic apparatus shown in FIG. 25 can perform work such as supplying, removing, transporting, and assembling a precision device or a component forming the precision device. The robot 1700 is a six-axis robot and has a base 1720 fixed to a floor or ceiling, a first arm 1730 pivotably coupled to the base 1720, a second arm 1740 pivotably coupled to the first arm 1730, and a third arm 1750 pivotably coupled to the second arm 1740. The robot 1700 also has a fourth arm 1760 pivotably coupled to the third arm 1750, a fifth arm 1770 pivotably coupled to the fourth arm 1760, a sixth arm 1780 pivotably coupled to the fifth arm 1770, and a control device 1810 controlling the driving of the first to sixth arms 1730 to 1780.

The sixth arm 1780 is provided with a hand coupling part. At the hand coupling part, an end effector 1820 corresponding to the work to be executed by the robot 1700 is installed. A driver device 1800 is installed at all or a part of individual joints parts. The driver device 1800 causes the first to sixth arms 1730 to 1780 to pivot.

A sensor module 1850 including the inertial sensor 1 as an acceleration sensor and including an angular velocity sensor is installed at each of the first to sixth arms 1730 to 1780. The sensor module 1850 can detect an acceleration and an angular velocity acting on each of the first to sixth arms 1730 to 1780.

The control device 1810 as a control circuit is formed of a computer and has, for example, a CPU (central processing unit), a memory, an interface and the like. The processor executes a predetermined program stored in the memory, and the control device 1810 thus controls the driving of each part of the robot 1700. The entirety or a part of the configuration of the control device 1810 may be provided outside the robot 1700 and coupled via a communication network such as a local area network.

The control device 1810 computes the positions and attitudes of the first to sixth arms 1730 to 1780, based on a detection signal outputted from the sensor module 1850, and controls the driver device 1800, based on the result of the computation.

In this way, the robot 1700 as an electronic apparatus has the inertial sensor 1 and the control device 1810 performing control based on a detection signal outputted from the inertial sensor 1. Therefore, the robot 1700 can have the effects of the inertial sensor 1 and can achieve high reliability.

The inertial sensor, the electronic apparatus, and the vehicle according to the present disclosure have been described above, based on the illustrated embodiments. However, the present disclosure is not limited to these embodiments. The configuration of each part can be replaced by any configuration having a similar function. Also, any other component may be added to the present disclosure. Moreover, the foregoing embodiments may be suitably combined together.

The contents derived from the embodiments will now be described.

An inertial sensor includes: a sensor unit; a base substrate having the sensor unit arranged at one surface thereof and having a first lateral surface intersecting the one surface and a second lateral surface opposite to the first lateral surface; a package accommodating the sensor unit and the base substrate; a first adhesive bonding together an other surface of the base substrate and an inner bottom surface of the package; a second adhesive bonding together a first inner wall surface which intersects the inner bottom surface of the package and is opposite the first lateral surface, and the first lateral surface, the second adhesive being different from the first adhesive; and a third adhesive bonding together a second inner wall surface which intersects the inner bottom surface of the package and is opposite the second lateral surface, and the second lateral surface, the third adhesive being different from the first adhesive.

In the inertial sensor having this configuration, the other surface of the base substrate and the inner bottom surface of the package are bonded together with the first adhesive. Therefore, the accuracy of the installation position of the sensor element to the package is improved, compared with the inertial sensor in which only the inner wall surface of the package and the lateral surface of the base substrate are bonded together. Also, in this inertial sensor, the first lateral surface of the base substrate and the first inner wall surface of the package are bonded together with the second adhesive, and the second lateral surface of the base substrate and the second inner wall surface of the package are bonded together with the third adhesive. Thus, a tensile stress acts in the horizontal direction along the one surface of the base substrate due to the second adhesive and the third adhesive. This restrains the base substrate from warping in the vertical direction intersecting the one surface of the base substrate due to the expansion and contraction of the first adhesive when a temperature change is applied to the inertial sensor. Accordingly, an inertial sensor that can accurately detect inertia can be provided.

In the inertial sensor, the base substrate may be a rectangle having a first shorter side and a second shorter side opposite the first shorter side, as viewed in a plan view. The first lateral surface may correspond to the first shorter side. The second lateral surface may correspond to the second shorter side.

In the inertial sensor having this configuration, the first lateral surface corresponding to the first shorter side of the base substrate and the first inner wall surface of the package are bonded together with the second adhesive, and the second lateral surface corresponding to the second shorter side of the base substrate and the second inner wall surface of the package are bonded together with the third adhesive. When the base substrate is a rectangle, the warp generated along the longer sides is larger than the warp generated along the shorter sides. Therefore, the warp generated in the base substrate can be effectively restrained.

In the inertial sensor, the base substrate may have a third lateral surface intersecting the one surface and adjacent to the first lateral surface and the second lateral surface, and a fourth lateral surface intersecting the one surface and adjacent to the first lateral surface and the second lateral surface and opposite to the third lateral surface. The package may have a third inner wall surface intersecting the inner bottom surface and adjacent to the first inner wall surface and the second inner wall surface, and a fourth inner wall surface intersecting the inner bottom surface and adjacent to the first inner wall surface and the second inner wall surface and opposite to the third inner wall surface. The second adhesive may extend between the third lateral surface and the third inner wall surface and bond together the third lateral surface and the third inner wall surface. The second adhesive may extend between the fourth lateral surface and the fourth inner wall surface and bond together the fourth lateral surface and the fourth inner wall surface.

In the inertial sensor having this configuration, the first lateral surface, the third lateral surface, and the fourth lateral surface of the base substrate and the first inner wall surface, the third inner wall surface, and the fourth inner wall surface of the package are bonded together with the second adhesive, and the second lateral surface of the base substrate and the second inner wall surface of the package are bonded together with the third adhesive. Thus, a tensile stress acts in the horizontal direction along the one surface of the base substrate due to the second adhesive and the third adhesive. This restrains the base substrate from warping in the vertical direction intersecting the one surface of the base substrate due to the expansion and contraction of the first adhesive when a temperature change is applied to the inertial sensor.

In the inertial sensor, the second adhesive and the third adhesive may have a lower coefficient of linear expansion than the first adhesive.

In this configuration, the expansion and contraction of the second adhesive and the third adhesive due to a temperature change is smaller than the expansion and contraction of the first adhesive. Therefore, the warp of the base substrate caused by the first adhesive is restrained by the second adhesive and the third adhesive.

In the inertial sensor, the second adhesive and the third adhesive may have a higher coefficient of linear expansion than the base substrate.

In this configuration, the expansion and contraction of the second adhesive and the third adhesive due to a temperature change is greater than the expansion and contraction of the base substrate and a tensile or compressive stress acts in the direction perpendicular to the direction of warp of the base substrate. Therefore, the warp of the base substrate is restrained by the second adhesive and the third adhesive.

In the inertial sensor, the second adhesive and the third adhesive may have a higher modulus of elasticity than the first adhesive.

In this configuration, the second adhesive and the third adhesive has a higher rigidity than the first adhesive. Therefore, the warp of the base substrate is restrained by the second adhesive and the third adhesive.

In the inertial sensor, the first adhesive may be one of a silicone-based adhesive and a polyimide-based adhesive. The second adhesive and the third adhesive may be epoxy-based adhesives.

In this configuration, the second adhesive and the third adhesive have a lower coefficient of linear expansion than the first adhesive and have a higher modulus of elasticity than the first adhesive. Therefore, the warp of the base substate can be suitably restrained.

In the inertial sensor, the first adhesive, the second adhesive, and the third adhesive may be epoxy-based adhesives having different coefficients of linear expansion and different moduli of elasticity from each other.

In this configuration, epoxy-based adhesives are used as the first adhesive, the second adhesive, and the third adhesive, and the second adhesive and the third adhesive can have a lower coefficient of linear expansion than the first adhesive and have a higher modulus of elasticity than the first adhesive. Thus, the warp of the base substrate can be suitably restrained.

In the inertial sensor, an unevenness may be formed at the first lateral surface and the second lateral surface.

This configuration increases the contact area between the second adhesive and the first lateral surface of the base substrate and the contact area between the third adhesive and the second lateral surface. Therefore, the warp of the base substrate can be suitably restrained.

A method for manufacturing an inertial sensor is for an inertial sensor including a sensor unit, a base substrate having the sensor unit arranged at one surface thereof and having a first lateral surface intersecting the one surface and a second lateral surface opposite to the first lateral surface, a package accommodating the sensor unit and the base substrate, a first adhesive bonding together an other surface of the base substrate and an inner bottom surface of the package, a second adhesive bonding together a first inner wall surface which intersects the inner bottom surface of the package and is opposite the first lateral surface, and the first lateral surface, the second adhesive being different from the first adhesive, and a third adhesive bonding together a second inner wall surface which intersects the inner bottom surface of the package and is opposite the second lateral surface, and the second lateral surface, the third adhesive being different from the first adhesive. The method includes: a first bonding step of bonding together the other surface of the base substrate and the inner bottom surface of the package with the first adhesive; a second bonding step of bonding together the first lateral surface of the base substrate and the first inner wall surface of package with the second adhesive; and a third bonding step of bonding together the second lateral surface of the base substrate and the second inner wall surface of the package with the third adhesive.

In this method, the other surface of the base substrate and the inner bottom surface of the package are bonded together with the first adhesive in the first bonding step. Therefore, the accuracy of the installation position of the sensor element to the package is improved, compared with the inertial sensor in which only the inner wall surface of the package and the lateral surface of the base substrate are bonded together. In the second bonding step, the first lateral surface of the base substrate and the first inner wall surface of the package are bonded together with the second adhesive. In the third bonding step, the second lateral surface of the base substrate and the second inner wall surface of the package are bonded together with the third adhesive. Thus, a tensile stress acts in the horizontal direction along the one surface of the base substrate due to the second adhesive and the third adhesive. This reduces the base substrate from warping in the vertical direction intersecting the one surface of the base substrate due to the expansion and contraction of the first adhesive when a temperature change is applied to the inertial sensor. Therefore, a method for manufacturing an inertial sensor that can accurately detect inertia can be provided.

An electronic apparatus includes: the inertial sensor according to any of the above descriptions; and a control circuit performing control based on a detection signal outputted from the inertial sensor.

The electronic apparatus having this configuration can have the effects of the inertial sensor and can achieve high reliability.

A vehicle includes: the inertial sensor according to any of the above descriptions; and a control circuit performing control based on a detection signal outputted from the inertial sensor.

The vehicle having this configuration can have the effects of the inertial sensor and can achieve high reliability.

What is claimed is:

1. An inertial sensor comprising:
    a sensor unit;
    a base substrate having the sensor unit arranged at one surface thereof and having a first lateral surface intersecting the one surface and a second lateral surface opposite to the first lateral surface;
    a package accommodating the sensor unit and the base substrate, the package having an inner bottom surface, a first inner wall surface intersecting the inner bottom surface and opposite the first lateral surface, and a second inner wall surface intersecting the inner bottom surface and opposite the second lateral surface;
    a first adhesive bonding together an other surface of the base substrate and the inner bottom surface of the package;
    a second adhesive bonding together the first inner wall surface of the package and the first lateral surface, the second adhesive being different from the first adhesive; and
    a third adhesive bonding together the second inner wall surface of the package and the second lateral surface, the third adhesive being different from the first adhesive.

2. The inertial sensor according to claim 1, wherein
    the base substrate is a rectangle having a first shorter side and a second shorter side opposite the first shorter side, as viewed in a plan view,
    the first lateral surface corresponds to the first shorter side, and the second lateral surface corresponds to the second shorter side.

3. The inertial sensor according to claim 1, wherein
the base substrate has
  a third lateral surface intersecting the one surface and adjacent to the first lateral surface and the second lateral surface, and
  a fourth lateral surface intersecting the one surface and adjacent to the first lateral surface and the second lateral surface and opposite to the third lateral surface,
the package has
  a third inner wall surface intersecting the inner bottom surface and adjacent to the first inner wall surface and the second inner wall surface, and
  a fourth inner wall surface intersecting the inner bottom surface and adjacent to the first inner wall surface and the second inner wall surface and opposite to the third inner wall surface, and
the second adhesive extends between the third lateral surface and the third inner wall surface and bonds together the third lateral surface and the third inner wall surface, and extends between the fourth lateral surface and the fourth inner wall surface and bonds together the fourth lateral surface and the fourth inner wall surface.

4. The inertial sensor according to claim 1, wherein
the second adhesive and the third adhesive have a lower coefficient of linear expansion than the first adhesive.

5. The inertial sensor according to claim 4, wherein
the second adhesive and the third adhesive have a higher coefficient of linear expansion than the base substrate.

6. The inertial sensor according to claim 1, wherein
the second adhesive and the third adhesive have a higher modulus of elasticity than the first adhesive.

7. The inertial sensor according to claim 1, wherein
the first adhesive is one of a silicone-based adhesive and a polyimide-based adhesive, and
the second adhesive and the third adhesive are epoxy-based adhesives.

8. The inertial sensor according to claim 1, wherein
the first adhesive, the second adhesive, and the third adhesive are epoxy-based adhesives having different coefficients of linear expansion and different moduli of elasticity from each other.

9. The inertial sensor according to claim 1, wherein
an unevenness is formed at the first lateral surface and the second lateral surface.

10. An inertial sensor comprising:
a sensor unit;
a base substrate having the sensor unit arranged at a first surface thereof, the base substrate having a first lateral surface intersecting the one surface, a second lateral surface opposite to the first lateral surface, a third lateral surface intersecting the one surface and adjacent to the first lateral surface and the second lateral surface, a fourth lateral surface intersecting the one surface and adjacent to the first lateral surface and the second lateral surface and opposite to the third lateral surface, and a second surface opposite to the first surface;
a package accommodating the sensor unit and the base substrate, the package having an inner bottom surface, a first inner wall surface intersecting the inner bottom surface and opposite the first lateral surface, a second inner wall surface intersecting the inner bottom surface and opposite the second lateral surface, a third inner wall surface intersecting the inner bottom surface and opposite the third lateral surface, and a fourth inner wall surface intersecting the inner bottom surface and opposite the fourth lateral surface;
a first adhesive bonding together the second surface of the base substrate and the inner bottom surface of the package; and
a second adhesive bonding together the first inner wall surface of the package and the first lateral surface, bonding together the second inner wall surface of the package and the second lateral surface, bonding together the third inner wall surface of the package and the third lateral surface, and bonding together the fourth inner wall surface of the package and the fourth lateral surface, the second adhesive being different from the first adhesive.

11. An inertial sensor comprising:
a structure having a sensor element and an integrated circuit; and
a package accommodating the structure,
the integrated circuit having a drive circuit which drives the sensor element and a processing unit which processes a signal from the sensor element,
the sensor element having a base substrate and a sensor unit,
the base substrate having a first surface at where the sensor unit arranged, a first lateral surface intersecting the first lateral surface, a second lateral surface opposite to the first lateral surface, and a second surface opposite to the first surface,
the second surface being bonded to the integrated circuit with a first adhesive,
the package having an inner bottom surface, a first inner wall surface intersecting the inner bottom surface and opposite the first lateral surface, and a second inner wall surface intersecting the inner bottom surface and opposite the second lateral surface,
the first inner wall surface of the package being bonded to the first lateral surface with a second adhesive that is different from the first adhesive,
the second inner wall surface of the package being bonded to the second lateral surface with a third adhesive that is different from the first adhesive.

12. The inertial sensor according to claim 11, wherein
the sensor element is electrically coupled to the integrated circuit via a bonding wire, and
the bonding wire is provided in the second adhesive.

13. The inertial sensor according to claim 11, wherein
the package is provided with a terminal,
the integrated circuit is electrically coupled to the terminal of the package via a bonding wire, and
the bonding wire is provided in the second adhesive.

14. An electronic apparatus comprising:
the inertial sensor according to claim 1; and
a control circuit performing control based on a detection signal outputted from the inertial sensor.

15. A vehicle comprising:
the inertial sensor according to claim 1; and
a control circuit performing control based on a detection signal outputted from the inertial sensor.

* * * * *